US012792374B2

(12) United States Patent
Guha

(10) Patent No.: US 12,792,374 B2
(45) Date of Patent: Nov. 10, 2026

(54) SYSTEMS AND METHODS FOR DYNAMIC PROVISIONING OF RESOURCES FOR VIRTUALIZED

(71) Applicant: Aloke Guha, Louisville, CO (US)

(72) Inventor: Aloke Guha, Louisville, CO (US)

( * ) Notice: Subject to any disclaimer, the term of this patent is extended or adjusted under 35 U.S.C. 154(b) by 643 days.

(21) Appl. No.: 17/169,963

(22) Filed: Feb. 8, 2021

(65) Prior Publication Data

US 2021/0349749 A1 Nov. 11, 2021

Related U.S. Application Data

(63) Continuation-in-part of application No. 15/479,042, filed on Apr. 4, 2017, now abandoned, which is a continuation-in-part of application No. 13/767,829, filed on Feb. 14, 2013, now abandoned.

(60) Provisional application No. 61/732,838, filed on Dec. 3, 2012, provisional application No. 61/598,803, filed on Feb. 14, 2012.

(51) Int. Cl.

| | |
|---|---|
| ***G06F 9/455*** | (2018.01) |
| ***G06F 9/50*** | (2006.01) |
| ***H04L 41/5009*** | (2022.01) |
| ***H04L 43/0852*** | (2022.01) |
| ***H04L 43/0882*** | (2022.01) |

(52) U.S. Cl.

CPC ........ *G06F 9/45558* (2013.01); *G06F 9/5077* (2013.01); *G06F 9/5083* (2013.01); *H04L 41/5009* (2013.01); *H04L 43/0852* (2013.01); *H04L 43/0882* (2013.01); *G06F 2009/4557* (2013.01); *G06F 2009/45595* (2013.01)

(58) Field of Classification Search

CPC .. G06F 9/45558; G06F 9/5077; G06F 9/5083; G06F 2009/4557; G06F 2009/45595; H04L 41/5009; H04L 43/0852; H04L 43/0882

See application file for complete search history.

(56) References Cited

U.S. PATENT DOCUMENTS 6,701,342 B1 * 3/2004 Bartz .................. H04L 41/5003 709/200
8,307,362 B1 * 11/2012 Gong .................... G06F 9/5077 718/1
8,898,402 B1 * 11/2014 Stronge ................. G06F 3/0605 711/100
2013/0055249 A1 * 2/2013 Vaghani ............. G06F 9/45558 718/1

(Continued)

*Primary Examiner* — Wissam Rashid

(57) ABSTRACT

In one aspect, a method for dynamic provisioning storage for virtual machines by meeting the service level objectives (SLOB) set in the service level agreement (SLA) is provided. The SLA pertains to the operation of a first virtual machine, the method includes the step of monitoring the workload of the first virtual machine. The method includes the step of establishing at least one SLO, typically on performance, in response to the workload. The SLO comprises a set of specific performance targets requirements for a service level of the workload of the first virtual machine that are designed to be met by the provisioned resource so as to comply with the SLA by meeting the SLO. The provisioned resource is associated with the first virtual machine. The method determines an SLA that specifies the first SLO. The SLA comprises a contract that includes consequences of meeting or missing the SLO.

1 Claim, 14 Drawing Sheets

(56) References Cited

U.S. PATENT DOCUMENTS

| | | | | |
|---|---|---|---|---|
| 2013/0111033 | A1 * | 5/2013 | Mao | G06F 9/5027<br>709/226 |

* cited by examiner

1400

SYSTEMS AND METHODS FOR DYNAMIC PROVISIONING OF RESOURCES FOR VIRTUALIZED

CROSS-REFERENCE TO RELATED APPLICATIONS

The application is a continuation in part of and claims priority to U.S. patent application Ser. No. 15/479,042, titled Systems And Methods For Provisioning Of Storage For Virtualized Applications, and filed on Apr. 4, 2017. This application is hereby incorporated by reference for all that is disclosed therein.

This application claims priority to U.S. Provisional Patent Application 61/598,803 titled "OPTIMIZING APPLICATION PERFORMANCE ON SHARED INFRASTRUCTURE USING SLAB" filed on Feb. 14, 2012 and U.S. Provisional Patent Application 61/732,838 "SYSTEM AND METHOD FOR SLA-BASED DYNAMIC PROVISIONING ON SHARED STORAGE" filed on Dec. 3, 2012, which are both hereby incorporated by reference for all that is disclosed therein.

BACKGROUND

A common approach to managing quality of service for applications, in physical or virtualized computers or virtual machines (VMs), in computer network systems has been to specify a service level agreement (SLA) on the services provided to the application and then complying with the SLA based on meeting specific objectives, called Service Level Objectives, on the service. In the case of applications, virtualized or not, an important task is to provision or allocate the appropriate storage per the SLA requirements over the lifecycle of the application. The problem of provisioning the right storage to is most significant in virtualized data centers, whether on-premises or public cloud, where new instances of applications are deployed and/or virtual machines (VMs) are added or removed on an ongoing basis.

To ensure SLA-managed storage for VMs, which will be used to denote both the machine on which the application is deployed as well as the application workload it would be desirable to dynamically provision storage at the VM-level for each VM. There are a number of challenges in dynamic provisioning of VMs on shared storage. First, the target logical storage volume provisioned to the VM can be local to the virtual machine host server or the hypervisor host computer, behind a storage area network (SAN), or even remote across a wide area network (WAN). Second, the storage requirements for the VM as specified in the SLA can include objectives on many different attributes such as performance, capacity, availability, etc., that are both variable and not known a priori. Third, the performance aspects of a logical storage volume, e.g., a portion of a full storage RAID array or a file system share is difficult to estimate.

One common approach to provisioning VM storage is overprovisioning, i.e., over-allocating resources needed to satisfy the needs of the VM, even if the actual requirements are much lower than the capabilities of the physical storage system. The primary reason for overprovisioning is that the storage system does not have visibility to the application workload needs or the observed performance and to reduce the possibility of failure, over-allocate the storage resources required. Another approach taken by some VM manager software is to monitor the VM virtual storage service level targets or objectives on such attributes such as latency, spatial capacity, etc., and in the event that the storage system cannot meet the objectives for the SLA, migrate the VM virtual storage to an alternate physical storage system.

Unfortunately, reactively migrating VM virtual storage can result in performance problems. For example, the new storage system to which the VM has been migrated may not be the best choice. This is a limitation of the VM manager enforcing the SLAs for VMs since it does not have visibility into the detailed performance capabilities of the storage system. The storage system in many cases can make better decisions since it has in-depth knowledge of the physical storage attributes including availability or redundancy, compression, performance, encryption, and storage capacity. However, the physical storage system that contains the VM virtual storage does not always have visibility into the application workload's performance requirements. The combination of the limitations faced by the VM manager and storage systems increases the difficulty of dynamically provisioning VM storage in virtualized data centers.

BRIEF SUMMARY OF THE INVENTION

In one aspect, a method for dynamic provisioning resources for virtual machines by meeting the service level objectives (SLOB) set in the service level agreement (SLA) is provided. The SLA pertains to the operation of a first virtual machine, the method includes the step of monitoring a workload of the first virtual machine. The method includes the step of establishing at least one SLO, typically on performance, in response to the workload. The SLO comprises a set of specific performance target requirements for a service level of the workload of the first virtual machine that are designed to be met by the provisioned resource so as to comply with the SLA by meeting the SLO. The provisioned resource is associated with the first virtual machine. The method determines an SLA that meets/specifies the first SLO. The SLA comprises a contract that includes consequences of meeting or missing the SLO. The method includes the step of provisioning at least one resource used by the first virtual machine in response to the SLA not being satisfied. In the general case, the provisioning causes the SLA to be satisfied.

In another aspect, a method for dynamic provisioning of resources available to virtual machines is provided. The method includes the step of monitoring the workload of the first virtual machine. As the workload changes and is detected by the monitoring the dynamic provisioning ensures that that the workload profile is captured and a set of required resources are determined to meet the SLO for the workload. The method includes the step of establishing a first service level objective (SLO) in response to the workload of the first virtual machine. The first SLO comprises a set of specific performance requirements that are adapted in response to an enforcement of a first SLA to meet the first SLO. The method includes the step of complying with or meeting the first SLA by meeting the first SLO. After the first SLA is met by ensuring that the first SLO is satisfied; the workload of a second virtual machine is monitored. The method includes the step of establishing a second service level objective (SLO) in response to the resource requirements of the workload of the second virtual machine. The second SLO comprises a set of specific performance requirements that determines the resources needed to comply with the second SLA so as to meet the second SLO. The method includes the step of dynamically provisioning at least one resource used by the first virtual machine in response to the first SLA not being satisfied. The dynamic provisioning causes the first SLA to be satisfied and then adapting the resources to satisfy the second SLA by ensuring the second SLO is also met. The dynamic provisioning provides that workloads for both the virtual machines are captured and a set of required resources are determined to meet the SLO for both the workloads.

In another aspect, a method for dynamic provisioning of storage for virtual machines is provided. The method includes the step of running a first virtual machine on a shared data storage. The method includes the step of identifying at least one storage requirement for the first virtual machine required to meet the first SLO to comply with the first SLA. The method includes the step of adding a second virtual machine on the shared data storage when the at least one storage requirement for the first virtual machine has been satisfied and resources used by the first virtual machine accommodates a resource requirement for the second virtual machine so as to meet the first SLO to comply with the first SLA. The dynamic provisioning provides that a workload fingerprint is captured and a set of required resources are determined to meet the SLO for both virtual machine workloads.

BRIEF DESCRIPTION OF THE DRAWINGS

The present application can be best understood by reference to the following description taken in conjunction with the accompanying figures, in which like parts may be referred to by like numerals.

Figure 1:
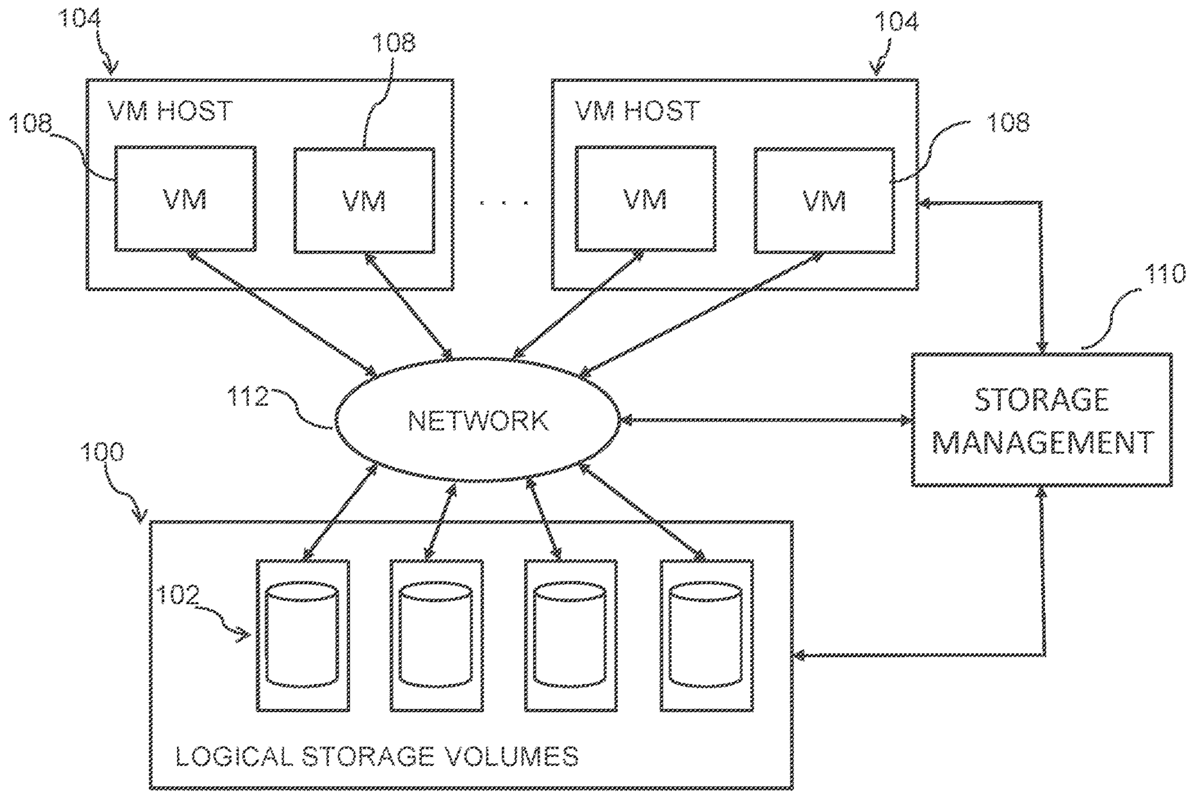
FIG. 1 is a block diagram illustrating virtual machines (VMs) connected to logical storage volumes (LSVs), according to some embodiments.

The Figures described above are a representative set and are not exhaustive with respect to embodying the invention.

DESCRIPTION

Disclosed are a system, method, and article of manufacture for systems and methods for provisioning of storage for virtualized applications. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Auto-scaling can be a web service designed to launch or terminate instances automatically based on user-defined policies, schedules, and health checks. Auto-Scaling can include Amazon EC2 Auto Scaling.

Cloud computing can be a delivery model for computing resources in which various servers, applications, data, and other resources are integrated and provided as a service over the Internet. Resources are often virtualized.

Dynamic provisioning can include, inter alia, moving a provisioned resource associated with a virtual machine. In some embodiments, dynamic provisioning can include using a different resource or changing a resource. During dynamic provisioning a resource can be changed, adapted, modified, increased, or decreased, etc., so as to provide the adequate type and level of resource as needed to meet the performance of the application running in the virtual machine.

Elastic computing can be the ability to dynamically provision and de-provision computer processing, memory, and storage resources to meet changing demands without worrying about capacity planning and engineering for peak usage. Learn more about elastic computing.

Infrastructure as a service (IaaS) can be a virtualized computer environment delivered as a service over the Internet by a provider. Infrastructure can include, inter alia: servers, network equipment, and software. IaaS can also be called hardware as a service (HaaS).

Istio is an open-source service mesh that layers transparently onto existing distributed applications. It is also a platform, including APIs that let it integrate into any logging platform, or telemetry or policy system. The term service mesh is used to describe the network of microservices that make up such applications and the interactions between them.

Jaeger is an open-source distributed tracing platform used for monitoring, network profiling, and troubleshooting the interactions between components in modern, cloud-native, microservices-based applications. Jaeger is based on the vendor-neutral OpenTracing APIs and instrumentation.

Kubernetes can be a portable, extensible, open-source platform for managing containerized workloads and services, that facilitates both declarative configuration and automation.

Kubernetes as Managed Service (e.g. Amazon Elastic Kubernetes Service (Amazon EKS), etc.) can be a managed service that simplifies running Kubernetes on AWS without needing to stand up or maintain your own Kubernetes control plane.

Persistent Volume (PV) (e.g. Virtual Storage in Kubernetes) can be a piece of storage in the cluster that has been provisioned by an administrator or dynamically provisioned using Storage Classes. It can be a resource in the cluster just like a node is a cluster resource.

Performance can include, inter alia: 1) attributes such as, inter alia: Latency, Bandwidth, number of requests/second satisfied, etc.; 2) availability (e.g., number of hours uptime, number of hours downtime, etc.) as a percentage; etc.

Loki is a horizontally-scalable, highly-available, multi-tenant log aggregation system inspired by Prometheus. Loki is released under the Apache 2.0 License.

Prometheus is a free software application used for event monitoring and alerting. Prometheus is a widely-adopted open-source metrics-based monitoring and alerting system. Initially developed at SoundCloud to solve end user needs, Prometheus is now hosted by the Cloud Native Computing Foundation (CNCF).

Service Level Agreement (SLA) can be a contract between a provider and its customers that specifies what service is to be provided, and includes consequences of meeting (or missing) the service level objectives (SLOB) related to the service. The consequences can be recognized when they are financial (e.g. a rebate or a penalty), but they can take other forms.

Service Level Objective (SLO) can specify a measurable characteristic of the SLA such as response time, throughput, availability, etc. The SLO is set on a defined quantitative measure of some aspect of the level of service that is provided or a service level indicator (SLI), such as response time latency must be less than one-hundred milliseconds (100 ms).

Software as a service (SaaS) can be an application delivered over the Internet by a provider. SaaS can also be called a hosted application. The application does not have to be purchased, installed, or run-on users' computers. SaaS providers were previously referred to as ASPs (e.g. application service providers).

Serverless computing can be a computing model in which the cloud provider provisions and manages servers. Serverless computing enables developers to spend more time building apps and less time managing infrastructure.

Virtual CPU (vCPU) can be a virtual processor, is a physical central processing unit (CPU) that is assigned to a virtual machine (VM).

Virtual Disk/Storage (cloud) can be a form of cloud storage as the abstraction, pooling, and sharing of storage resources through the internet. Cloud storage is facilitated by IT environments known as clouds, which enable cloud computing. The act of running workloads within a cloud environment.

Virtual Memory (cloud): in a virtualized computing environment, physical memory is partitioned into virtualized physical memory. Virtual memory management techniques are used to allocate additional memory to a virtual machine.

Virtual private cloud (VPC) can be an elastic network populated by infrastructure, platform, and application services that share common security and interconnection.

Virtual Storage (e.g. Amazon Elastic Block Store (Amazon EBS), etc.) can be a service that provides block level storage volumes for use with EC2 instances.

Volume can be a fixed amount of storage on an instance. Volume data can be shared between containers and persist the data on the container instance when the containers are no longer running.

Example Systems and Methods

The problem addressed in this application is how to provide storage quality of service to applications running in virtualized data centers or where applications are on shared storage infrastructure. Additionally, the storage system can provide storage and data management services on a per-application or virtualized application basis.

Embodiments of virtual machine (VM) level storage provisioning are disclosed herein. The embodiments include VM-level logical storage volumes (LSVs) that present a granular abstraction of the storage so that it can create and manage VM-level storage objects the same way regardless of the storage area network protocol that provides the connectivity from VMs to the shared storage system.

VM-level logical storage is the logical storage volume within a pre-defined shared data storage (SDS) system that is allocated to each VM. A block diagram showing an example of a logical shared data storage 100 is shown in FIG. 1. The shared data storage 100 includes a plurality of logical storage volumes 102 that are accessible from a set of VMs 108 located in a plurality of hosts 104 through a storage network connection 112, which is referred to simply as the network 112. The network 112 can be embodied many different types of networks including as a Fibre Channel storage area network, or an iSCSI (Internet Small Computer System Interface) network or and Internet Protocol (IP) based Ethernet network.

Each VM host 104 is associated with at least one virtual machine 108. Thus, the storage requirements of a VM host 104 can be met by picking at least one logical storage volume 102 from the shared data storage 100 by means of the network 112. The shared data storage 100 can be implemented in many different embodiments, including as block storage in a hard disk array or as a file system that uses the hard disk array as its backend storage. The VM 108 can express its requirements of its logical storage volume in such attributes as availability, performance, capacity, etc. These requirements can then be sent to a storage management system 110, which can coordinate with the shared data storage 100 to determine which logical storage volume 102 is the optimal choice to meet the requirements. The VM requirements for storage may be expressed in the form of a storage template are sometimes referred to as storage level objectives (SLOs). The storage provisioning system that is thus embodied in the storage management 110 then can discover logical storage volumes 102 on a multiplicity of shared data storage, local or remote, that will currently meet the SLOs of the storage profile for the VM 108.

The use of a logical storage volumes 102 that are independent of the implementation of underlying shared data storage 100, whether as a hard disk array or a file system and independent of the network 112 that provides connectivity of the VM 108 to its storage, creates a VM level granular storage abstraction. Such VM-level storage abstraction decouples the location of VM storage from the physical location on a shared data storage (SDS) while providing the granular flexibility of either. This may be accomplished by two methods. The first method is accomplished at least in part by assigning the VM storage to a different logical storage volume 102 on a different SDS 100 if the SLOs for the VM's storage cannot be met by a vVol on the current SDS 100. The second method may be accomplished by modifying or "morphing" the current logical storage volume 102 by changing the resource allocation to the logical storage volume 102 on the SDS 100 when it is possible to meet the SLOs. Such an approach allows more proactive control for storage systems to modify the current VM storage, or select the best target location for the VM storage. By using either of the two above-described approaches, a dynamic storage provisioning system can be implemented that continually adapts itself to meet application SLAs by meeting specific SLOs in performance, availability, compression, security, etc.

Based on the foregoing, it can be seen that the provisioning action is equivalent to mapping a number V of virtual machines (VMs) 108 to N, wherein N>V, logical storage volumes 102 (LSVs). This provisioning can be represented by M(i)=j, where i<=V and where a specific VM 108 is assigned to LSV j, and where j<=N, on a given SDS 100.

In some embodiments, the VMs hosts 104 are located in a data center or the like. The VMs 108 are associated with VM hosts 104 that embody virtual machine management systems or hypervisor servers (not shown). The complete mapping of all VM hosts 104 in a data center or the like will include all VMs 108 on all hypervisors and all logical storage volumes 102 on all SDSs 100.

Figure 2:
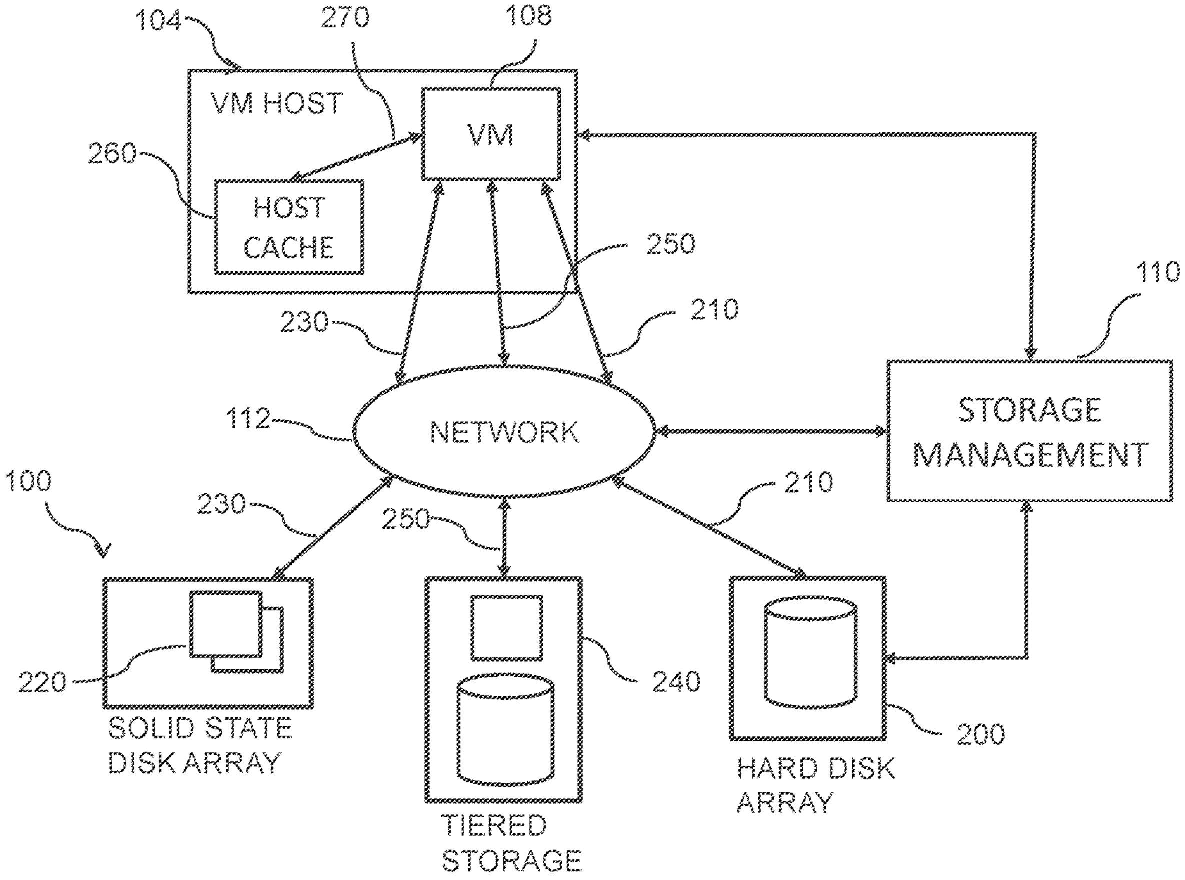
FIG. 2 is a block diagram illustrating four options for location of a logical storage volume, according to some embodiments.

The shared data storage 100 can be located in a multiplicity of locations in a data center as shown in FIG. 2. In this case, four different shared data storage 100 embodiments are shown. The first embodiment of the shared data storage 100 is a hard disk array storage 200 attached to the network 112. The VM 108 connects to it via a network path 210. The second embodiment of the shared data storage 100 is a solid-state disk or solid-state disk array 220. The VM 108 connects to it via a network path 230. The third embodiment of the shared data storage 100 is a tiered storage system 240 that may combine a solid-state disk and hard disk array. The VM 108 connects to the tiered storage system 240 via a network path 250. The fourth embodiment of the shared data storage 100 is a local host cache 260, typically a flash memory card or a locally attached solid state disk or array in the host 104 or the host computer system that contains the hypervisor and virtual machine manager and thus the VM 108. In this case, the VM 108 can connect with the local shared disk storage instance or host cache 260 via an internal network connection or bus connection 270. Because solid state disks are constructed from random access memory technologies, their read and write latencies are far lower than that of hard disk drives, although they are more expensive.

FIG. 2 therefore presents an example of the many choices that are available to the VM 108 to meet its specific storage SLOs. If the performance were of the highest priority in terms of latencies that are less than a millisecond, then locating its logical storage volume 102 on the shared data storage in the host cache 260 would be a good option. If read and write operations with low latency but larger storage space is a consideration, then provisioning the logical storage volume 102 on the solid-state array 220 behind the network 112 would be a better option because the network attached storage can accommodate large number of drives and therefore more capacity than usually possible within the host 104. If an intermediate performance is required then the tiered storage system 240 that uses solid state drives as a cache and hard disk arrays are the secondary tier would be a good option. Finally, if the latency needs are not as stringent and latencies of the order of milliseconds rather than microseconds are acceptable, the logical storage volume 102 can be provisioned on the hard disk array 200.

The above examples illustrate why multiple options exist to provisioning a logical storage volume 102 for a VM 108. The criteria for provisioning the storage for the VM 108 is dictated by the service level objectives (SLOB) for VM storage and the attributes of the available logical storage volumes 102. This provisioning process of selecting the most appropriate LSV 102 for a VM 108 will have to be done on a continuous basis since new VMs 108 may be added, which changes the total demand for storage in the data center. Furthermore, the pool of available LSVs 102 will change over time as storage is consumed by the existing operating VMs 108 on their LSVs 102 across all shared data storage 100, new shared data storage 100 are added, or potentially space for allocating LSVs 102 increases when an existing VM 108 is deleted or decommissioned.

As the storage needs for the VMs 108 changes and pools of LSVs 102 changes, the problem of provisioning becomes a dynamic one where of deciding which LSVs 102 are assigned to a VM 108 at any time. This implies that the provisioning function (mapping) M that assigns a VMi to LSVj is given by M(i)=j, where a specific VMi, i<=V, where the total number of VMs 108 is V, is assigned to LSV j, where j<=N, and LSV j is contained in shared data storage instance k, where k<=S, where S is the total number of shared data storage systems. It is expected the number of shared data storage systems S is far less than the total number N of logical storage volumes.

The basis for determining whether a VM 108 can be satisfied by an LSV 102 is determined by the service level objectives (SLOs) of the VM 108, that includes specifications or limits or thresholds on performance, availability, compression, security, etc. An example of a performance SLO could be latency less than 1 ms. An SLO on availability might include recovery time objective (RTO) or time it takes to recover from a data loss event and how long it takes to return to service. An example of such an SLO is that the RTO may equal thirty seconds. A SLO for a VMi can thus be expressed as a vector SLO(i) of dimension p, where there are p different service level objectives, including those on performance, data protection and availability, etc. Dynamic provisioning will therefore match a VM's SLOs vector and ensure that the LSV 102 that is assigned to the VM 108 meets/specifies all the SLO criteria specified in the VM's SLO vector.

If a currently provisioned LSVj cannot meet the SLO(i) for VMi, then a new mapping is required. An example of a new mapping is described by the following equation:

M(i)=k, k.noteq.j, where k<=N, the total number of LSVs where VMi is now assigned to LSVk, on any available SDS 100 such that SLO(i) is satisfied.

Therefore, the process for provisioning storage for VMs 108 includes the following steps. First, a VM 108 needs to specify at least one SLO vector for each VM 108. Second, all SDSs 100 that have VM-level volume access, or LSVs 102 are specified as well as the access points, or the protocol endpoint (PEs). Third, the SLO attributes of all LSVs that are available for provisioning are continuously updated as more VMs 108 are provisioned on the data store on which the LSV is located. Fourth, provisioning is the assignment of the best fit LSV 102 to the VM 108 based on its storage profile.

As part of the SLA management of storage services to the VMs 108, the approach needed to enforce the SLA on per LSV 102 when LSVs 102 are co-located on shared data storage 100 are described below. This includes end-end control of application-level input/output (IO) control where such control is possible, e.g., where application-level performance data can be collected.

The solution regarding how the SLAs are defined for an application or VM 108 (note that the term application and VM may be used interchangeably herein) that shares storage is embedded in the solution approach to the end-to-end storage IO performance service level enforcement.

The approaches described herein represent a close-loop control system for enforcing SLAs on applications that share storage. The approaches are applicable to both a virtualized infrastructure as well for multiple applications that share the same storage system even in cases where the applications are running on physical servers not using virtualization.

A common approach for solving the end-end VM to shared storage performance enforcement problem will now be described. In the following description, the VM to virtual storage connection is sometimes referred to as a nexus of VM-to-Logical Storage Volume or simply as an input-output (I/O)"flow." Additional reference is made to FIG. 3, which is a flowchart 300 depicting an embodiment of an approach to enforce predictable performance of applications using shared storage. There are five steps in the approach corresponding to the process shown in FIG. 3, which are described below. It is noted that the steps performed in the flow chart 300 may be performed by the storage management 110.

The first step of the flow chart 300 is step 302 where SLAs and service levels are set. SLAs are assigned by the user to each application or VM 108. An application may consist of one or more flows depending on whether distinct flows are created by an application. For example, metadata or index may be written to an LSV on a faster tier shared storage subsystem while the data for the application may be written to an LSV on a slower tier of storage. A single application can comprise a group of flows. In such a case, as in a backup application scenario, the backup application will comprise a multiplicity of flows from a VM 108 to a shared storage tier that is designated for streaming backups. Thus, each flow is therefore assigned an SLA and an associated service level (e.g., Platinum, Gold, Silver, etc.). The service levels are sometimes referred to as first, second, and third service levels, wherein the service level specifies the level of performance it is guaranteed using the implicit performance needs of the application flow. In addition, the user can also specify whether the underlying I/O workload is latency-sensitive, bandwidth- or data rate-sensitive, or mixed latency- and bandwidth-sensitive.

The next step in the flow chart 300 is to monitor the flow to capture workload attributes and characteristics in step 304. After the service level domains have been defined and SLAs have been assigned in step 302, the applications are run and information is collected on the nature of the workload by flow, and the performance each flow is experiencing.

While all flows are monitored on a continuous basis, during an initial period, information may be collected on each workload's static and dynamic attributes. Static attributes comprise information such as IO size, sequential vs. random, etc. Dynamic attributes include information on the rate of IO of arrival and burst size, etc., over the intrinsic time period of the workflow. The period of initial monitoring is kept large enough to capture typical temporal variability that is to be expected. For example, one to two weeks, but even much smaller timeframes can be chosen. Based on the policy of the user in how new applications are deployed into production, different application may be monitored over different periods of time when they run in physical isolation on the shared data storage 100, e.g., without any contention with other applications that share the storage, or are provisioned on LSVs on the same shared data storage.

Storage performance characteristics are captured in step 306 and workload attributes and characteristics are captured in step 308. In addition to collecting information on the workload for each flow, information is also gathered on a continuous basis of the performance of the shared storage that hosts the virtual storage for different applications at step 306. As stated above, workload attributes are captured at step 308, which may be IO failures or total memory usage. The goal is to obtain the total performance capacity of the shared disk storage 100 across all the flows that share it. Therefore, fine-grained performance data—to IO level based on IO attributes and per rate of IO submitted or completed, etc. may be collected.

Step 312 enforces the SLAs per flow. After initial monitoring is complete, a number of control techniques can be applied to enforce the SLAs on a group of flows associated with a virtualized application and on a flow basis. These techniques include admission control using rate shaping on each flow where rate shaping is determined by implicit performance needs of each application on the shared data storage 100 and SLA assigned to the flow.

SLA enforcement may also be achieved by deadline-based scheduling that ensures that latency sensitive IOs meet their deadlines while still meeting the service level assigned to the flow. This represents a finer-grain level of control beyond the rate shaping approach. Another enforcement approach is closed loop control at the application or virtual server level based on observed performance at the application level as opposed to the storage or storage network level.

The steps for the overall approach of SLA enforcement from a virtual server to the shared data storage 100 may include: assisting in defining SLAs; characterizing application IO workloads, as well build canonical workload templates for common applications; estimating performance capacity of shared storage; enforcing SLAs of applications; performance planning of applications on shared storage; and dynamic provisioning of applications.

Figure 8:
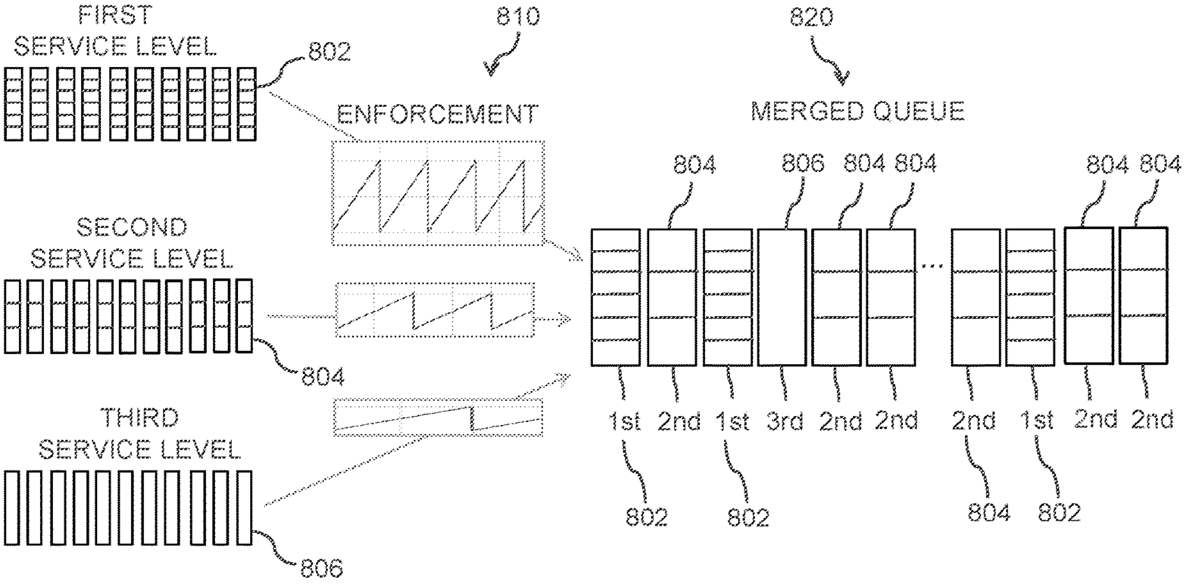
FIG. 8 is a graph showing closed loop SLA control at the network level from three applications with different SLAs, according to some embodiments.
Figure 9:
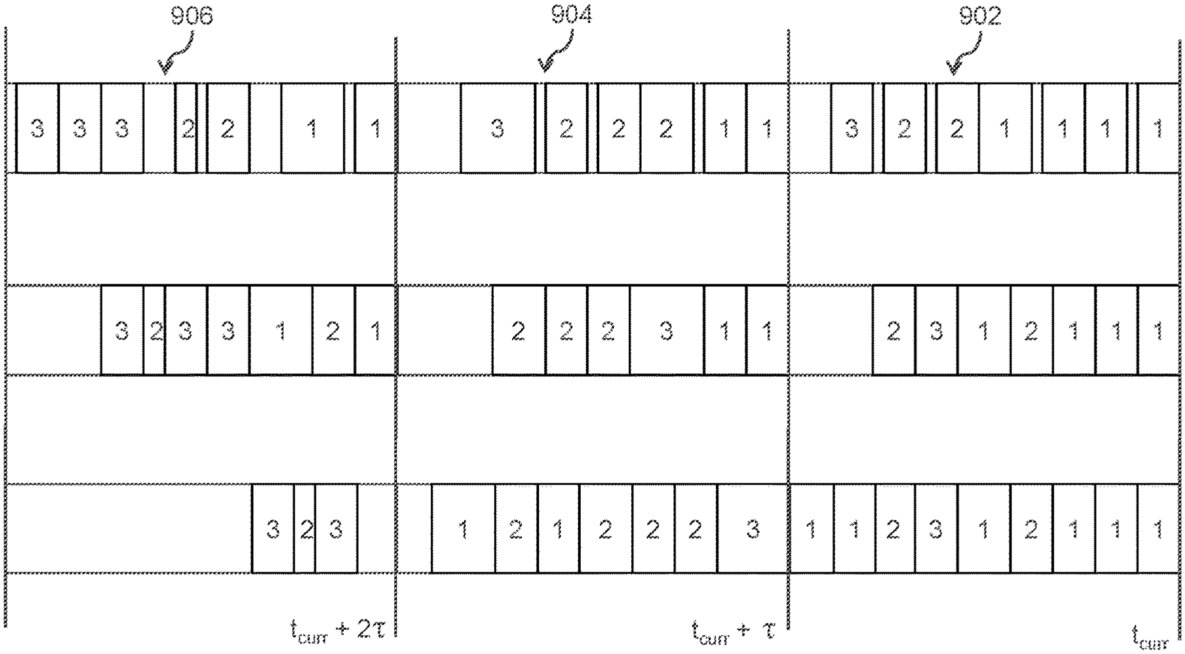
FIG. 9 is a graph showing closed loop SLA control used to enforce SLA adherence, according to some embodiments.
Figure 11:
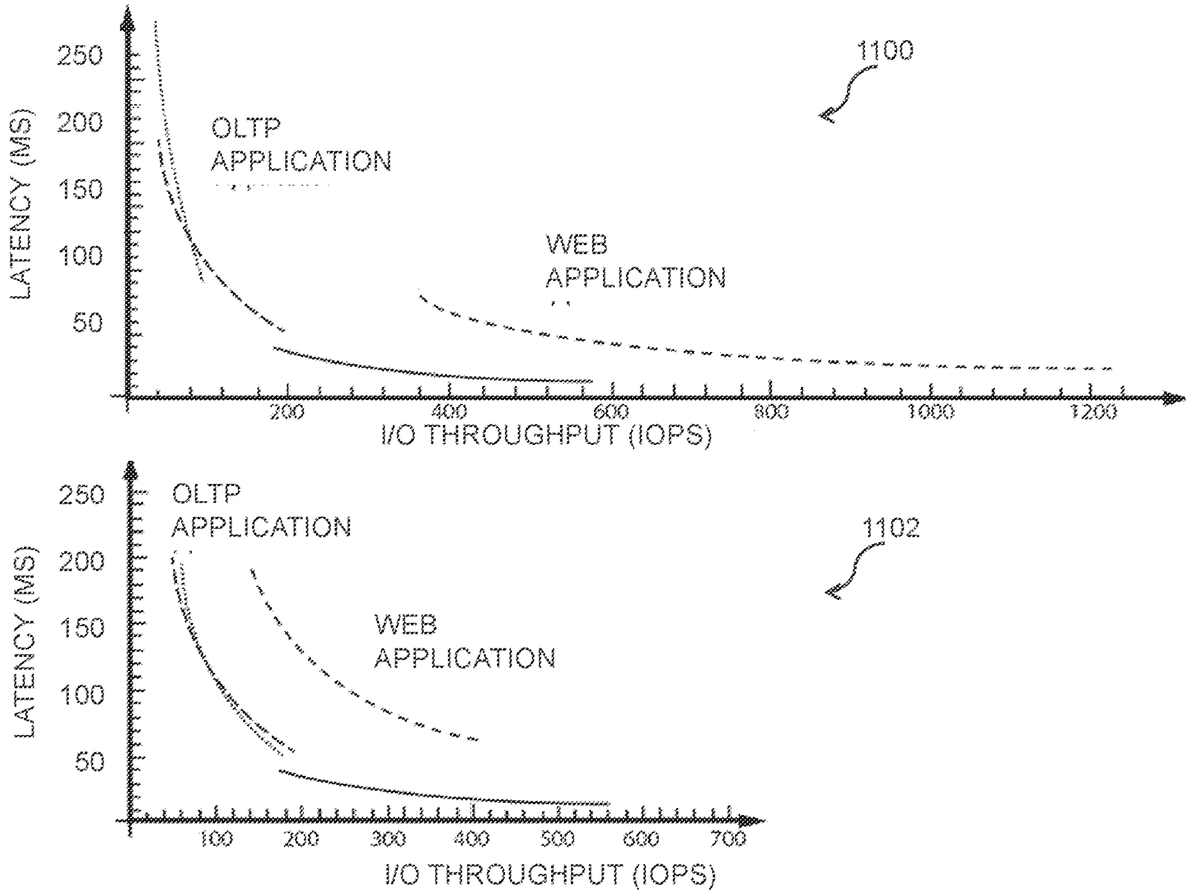
FIG. 11 is two graphs showing enforcement at a VM host server to enforce SLAs on a lower priority workload, according to some embodiments.

While the SLA monitoring and enforcement can be done at the storage network level, it may also be done outside of the host server. The host server may contain multiple applications or VMs, e.g., at the storage network (SAN) or IO network level, e.g., such as in a network switch. FIG. 11 is a diagram showing the monitoring and enforcement being done solely at the host server, while FIG. 8 is a diagram showing the monitoring and enforcement being done solely at the network the lower priority application App2, of 3 applications (VMs), increases its workload and causes failure to meet the SLAs for App1 and App3. FIG. 9 shows how closed loop control in the network improved SLA adherence for App3 is improved to acceptable levels when SLA is enforced on all workloads.

Reference is made to FIG. 11, which shows an embodiment of implementing SLA monitoring and enforcement at the host server 104. Once the flows from the application or VM 108 to shared data storage 100 has been defined and SLAs have been assigned, the monitoring ensures that IO attributes and statistics for each application flow is captured as needed to fully characterize the workload. Additionally, if SLA enforcement is enabled, then admission control, e.g., the rate at which each flow is allowed to reach its target logical storage volume and any required scheduling, is imposed on a per IO basis for each flow.

One of the problems that is described in this application addresses an approach to enforcing performance of an application (or VM) on shared storage per a priori defined service levels or SLAs. As described earlier the user is not assumed to have prior knowledge of the application's storage IO performance requirements, but sets service levels on the IO requirements based on implicit workload measurements and then sets different levels of enforcement on the IO required by the application.

One embodiment for SLA enforcement addresses the following conditions in providing SLA based guarantee of IO performance for physical or virtual applications on shared storage. SLAs on IO performance can be specified by implicit measures and do not need explicit performance measures, therefore, addressing workloads that are either latency or bandwidth sensitive or both. Enforcement of differentiated SLA guarantees for different applications on shared storage—different applications are provided with different SLAs and levels of guarantee. The workloads are dynamic. The SLA enforcement provides the option of both coarse-grained enforcement using rate-based IO traffic shaping and fine-grained enforcement using deadline-based scheduling at the storage IO level. The SLA enforcement may use closed-loop control to enforce IO performance SLOs at the application or VM level. Tight control of I/O performance is maintained up to the application level on the host server 104 or VM 108.

The embodiments include situations where the enforcement is enabled at the network or storage level, when the knowledge of the flow workload and its SLA can be provided centrally to the shared network or shared storage systems. Enforcement can also be at the host server 104 or VM host level and all of the IOs from the applications can be controlled at the IO emanating at the host server. Alternatively, the enforcement may be at the LSV 102 on the shared data storage 100.

Figure 3:
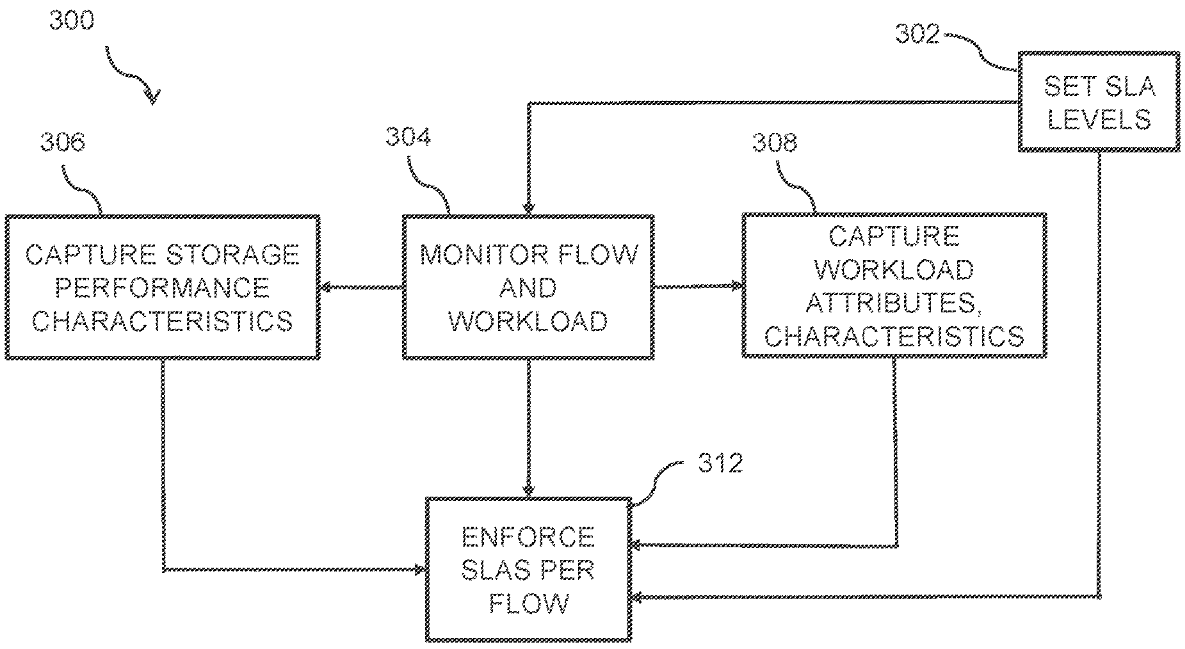
FIG. 3 is a flowchart depicting an embodiment for enforcing predictable performance of applications using shared storage, according to some embodiments.

More details on an implementation approach that assumes that the enforcement is executed in either a software appliance below the application as shown in FIG. 2, or in the VM host 104 as shown in FIG. 3 will now be described. The enforcement can be also implemented in the network 112 or in the VM host server. The implementation details are provided in the next section.

The SLA definition for any VM or application defined by a service level for the SLA assigned to a flow or workload, independent of the specific application and its workload.

In one embodiment, the system defines a set of "Service Levels", such as "Platinum", "Gold", "Silver", and "Bronze". These service levels may also be referred to as the first, second, and third service levels. Each of these service levels is defined by a consistency SLO on performance, and optionally, a "ceiling" and a "floor". Users select a service level for each application 104 by simply choosing the service level that has the desired consistency SLO percentage or performance.

In one embodiment, the Monitor Flow and Workload module 304, in FIG. 3, derives a fingerprint of the application or VM 10 over different intervals of time, milliseconds, to seconds to hour to day to week. Since the fingerprint is intended to represent the application's I/O requirements, it is understood that this fingerprint may need to be re-calculated when application behavior changes over time.

The monitor flow and workload module 304 isolates I/O from the application, monitors its characteristics, and stores the resulting fingerprint. In one embodiment, that fingerprint includes the I/O type (read, write, other), the I/O size, the I/O pattern (random, sequential), the frequency distribution of throughput (MB/sec), and the frequency distribution of latency (msec). An analytic module then calculates derived values from these raw values that can be used as inputs to an enforcement software program that will schedule I/O onto shared storage in order to meet the SLO requirements.

In the present embodiment, when the enforcement module cannot meet the consistency requirement for the fingerprint of an application, it will throttle the I/O of applications on shared storage systems that have lower service levels, and thus, lower consistency requirements. In addition, it will also enforce the ceiling and floor values if they are set for service levels.

The present embodiment may also have a provisioning and planning software module that assists the user, or automatically performs provisioning of an application by using the two-part SLO to determine which shared storage system is the best fit for the application, taking into account the SLOs of the other applications already provisioned onto that shared storage, and the amount of storage performance capacity that is required to meet all of the application SLO requirements. This module may also allow users to do what-if modeling to determine what service levels to assign to new applications.

The present embodiment may also have a storage utilization module that provides recommendations for maximizing efficiency of underlying shared storage systems, taking into account the SLOs of the applications that are running on those shared storage.

The definition of a two-part SLO that combines an intrinsic fingerprint with a consistency percentage or performance specification is unique. There are systems that characterize workloads and attempt to model their I/O performance. None of these systems use that model to set an SLO. In addition, the concept of a consistent percentage as a part of the SLO requirement is completely new. It allows the simple combination of business criticality and business priority with application I/O requirements.

Once a flow (from the VM to its logical storage volume) has been identified, it is monitored to characterize its IO workload. Specifically, attributes are captured at the individual IO packet level for every flow since each flow will have its characteristic workload as generated by the application. The data will be used directly or indirectly in derived form for SLA enforcement and for performance capacity estimation and workload templatization (e.g., creating common workloads templates to be expected from common classes of applications). The entities used here to connote different resources activities are described below.

Flow refers to the (VM 108-LSV 102) tuple or a similar combination of source of the IO and the target storage element on the logical disk volume or LUN (Logical Unit Number) that uniquely defines the flow or IO path from the Initiator (VM 108 or application) to the target storage unit (T, L) such as LSV 102. IO refers to individual IO packet associated with a flow Shared data storage 100 (SDS that contains the LSV 102 refers to the unit of shared disk resource.

In addition, metrics that need to be measured in real-time may need to be identified. Some examples of metrics are described below. At the individual IO packet level, attributes that need to be captured, either while IO packet, or IO, is in flight or when the response to an earlier IO is received, are:

- IOSize—the size of the IO packet in KB
- ReadWrite—identifies the SCSI command: whether Read, Write, or other non-Read or non-Write
- SeqRand—a Boolean value indicating whether the IO is part of a sequential or random Read or Write access
- Service Time or Latency of response to an IO—completion time of an IO by the storage system SDS
- IOSubmitted: Number Of IOs Submitted—over i) a small multiple of the intrinsic period of the application (tau) and for every ii) measurement interval, the 6-sec interval
- IOCompleted: Number of IOs Completed—per measurement interval
- MBTransferredRead: Total MBs Transferred (Read)—per interval
- MBTransferredWrite: Total MBs Transferred (Write)—per interval
- CacheHit: a Boolean value indicating whether the IO was served from the Cache or from Disk based on the observed value of the Service Time for an IO.

All periodic estimates for IO input rate or IO completion rate and statistical measures can be done outside the kernel (user space) since they can be done after IO input or completion information, such as Latency, do not have be done in the kernel but calculated in batch mode from stored data in the database. This also applies to estimating short term, e.g., over small periods less than the measurement interval, as well as every measurement interval, IOSubmissionRate and IOCompletionRate. More details on each of the above metrics, whether basic or derived, are provided below.

With the IO performance measurement done on a flow-by-flow basis, the ongoing and maximum performance of the shared data storage (SDS) that is shared across multiple flows can be tested.

Examples of data collected for estimating performance of shared data storage include:

- SumIOPs (SDS): sum of all AverageIOPsRead, and AverageIOPsWrite for all Flows active over the last interval, where IOPs is IO throughput in IOs/second;
- SumMBs (SDS): sum of all AverageMBsRead, and AverageMBsWrite for all Flows active over the last interval, where MBs is bandwidth in megabytes/sec; and
- MaxServiceTime (SDS): the maximum service time or latency observed over the interval across all Flows on the SDS;
- Note that SumIOPs (SDS), SumMBs (SDS), MaxServiceTime) are recorded as 3-tuple for the last interval. This 3-tuple is recorded for every interval suggested above. Note this metric is derived and maintained separately (from the workload attribute) for estimating performance capacity of all SDSs.

Another data point that is estimated is the maximum performance of each SDS 100. This can be done by injecting synthetic IO loads at idle times. Additionally, the peakIOPs (throughput) can be estimated from the inverse of the LQ slope where L is the measured IO latency and Q is the number of outstanding IOs. Thus, knowing the maximum performance capacity of the SDS 100 and the current IO capacity in use provides the available performance capacity at any time.

Figure 5:
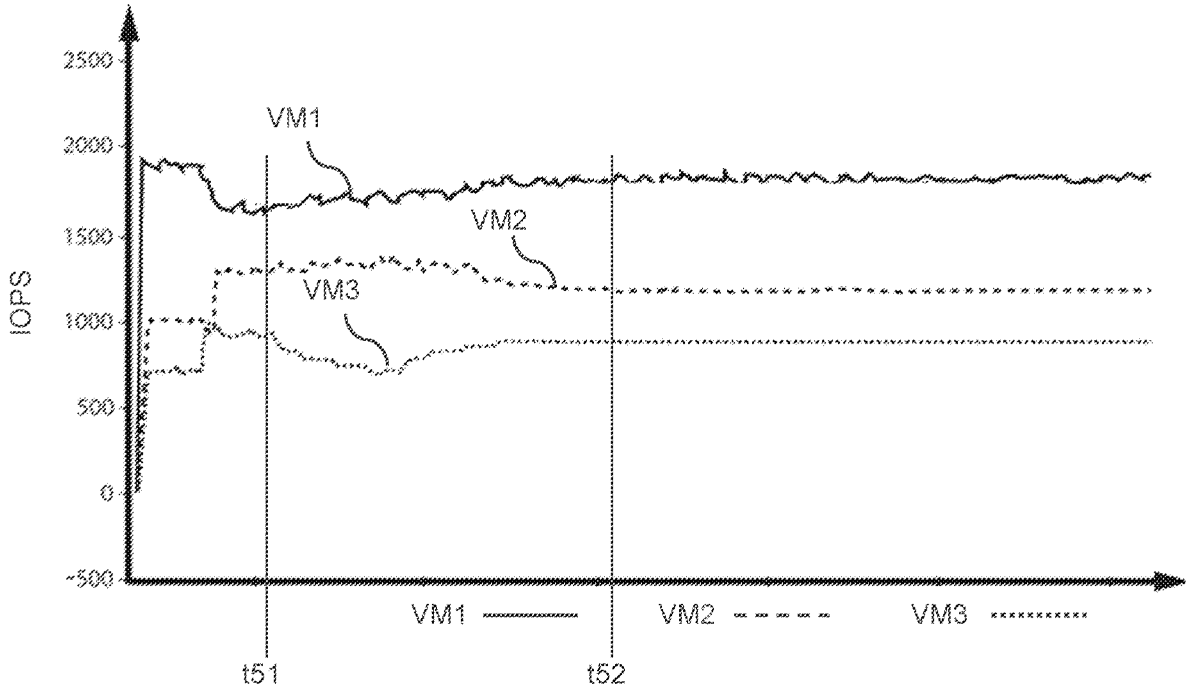
FIG. 5 is a graph showing an embodiment of using a bandwidth and input/output (IO) throughput to access residual performance capacity of a shared storage system, according to some embodiments.

Another approach to estimating available or residual IO or storage performance capacity can be in terms of estimating a combination of available bandwidth (MB/s) and throughput (IOPs) as shown in FIG. 5. One possible approach to modeling residual IO performance capacity, is to build the expected performance region across two dimensions, e.g., bandwidth (MB/s) and IO throughput or IOPs. As the SDS 100 is monitored over different loads, including synthetic workloads to force the system to its maximum performance limits, the expected performance envelope that provides us the maximum combination of MBs and IOPs possible as shown by the dashed line in FIG. 5 can be built. Therefore, at any time, the "current operating region" can be assessed and the maximum IOPs or MBs that can be expected are shown in a vector term. This vector represents the maximum additional bandwidth or throughput by any new application that can be added.

Workload characterization with token bucket models will now be described, which is well-suited for applications where the IO workload is not very bursty and can be adequately modeled using token bucket parameters (e.g., rate, maximum burst size).

IO measurements that use to characterize the VM workload by the monitor flow and workload module include:

- IOSize: IO size of all IOs is captured during each measurement interval, which should be a multiple of the shortest inter-arrival time of IOs;
- ReadWrite: nature of the SCSI command, e.g., Read or Write or neither R/W captured in the measurement interval. Also, aggregated after every measurement interval for the IOSize bucket;
- SeqRand: whether the IO is Sequential or Random captured in the measurement interval. This metric is also aggregated after every measurement interval. One easy way of capturing the Sequential versus Random information is to maintain two stateful variables. ReadWriteStatus flag per Flow that is set to R or W based on the most recent IO received from that Flow. LastAddressByte records the last byte that would be Read or Written based on start address and offset (given IO Size). Given, (i) and Iii) any new IO coming can be checked to see if the IO is of same type (Read or Write) as the last IO from the Flow, and if so, if the first address byte is consecutive to the LastAddressByte.

Derived IO Statistical Attributes

In addition to the workload characterization metrics described above, other statistical attributes may also be derived, which include:

IO size distribution: IO size data captured by the IO monitoring module may be bucketized into the following sizes, as per one embodiment:

Small: 4 KB or less;

Medium I: 5 KB to 16 KB;

Medium II: 17 KB-63 KB;

Large I: 64 KB-255 KB;

Large II: 256 KB-1023 KB;

Large III: 1024 KB and larger;

Average IO size—the average IO size for the last measurement/aggregation period;

Maximum IO size—the maximum IO size for the last measurement/aggregation period;

Minimum IO size—the minimum IO size for the last measurement/aggregation period;

Read/write distribution—single valued, percent read=(number of reads)/(number of reads+number of writes) maintained per IO size bucket;

Sequential random distribution—single valued, percent random (=100-percent sequential); and Non-read/write fraction-fraction of non-read/write IOs, e.g., percent of total IOs that are not Read or Write.

Basic IO Performance

To estimate the IO performance service levels for a VM, continuous measurements of different metrics may be captured, these service levels include:

ServiceTime (IOSize, ReadWrite, SeqRand): measured in real time by the IO monitoring module for the attributes IOSize, ReadWrite and SeqRand as described above;

AveServiceTime (IOSize, ReadWrite, SeqRand): average time to complete an IO request on the logical storage volume, and as sampled over the last 100 or 1000 IOs, for example. The number of IOs on which to average the Service Time may be based on experimentation and testing of deadline-based scheduling, in one possible embodiment. For example, the minimum averaging period could be 1000 IOs;

MaxServiceTime (IOSize, ReadWrite, SeqRand): the maximum service time observed to date to complete an IO request by target storage on Disk, as a function of—maintained in the example using a 6-sec interval, and updated every measurement interval. This is not computed by the IO monitoring module but aggregated in the Workload Database;

MinServiceTime (IOSize, ReadWrite, SeqRand): the maximum service time observed to date to complete an IO request on the logical storage volume. This metric is useful in verifying if an IO is serviced from hard disk, solid state disk or cache;

IOSubmitted: the number Of IOs submitted over i) a small multiple of the intrinsic period of the application (tau) when it is known during SLA Enforcement, and for every ii) measurement interval. This is also required to calculate the IO completion rate/IOSubmissionRate or the contention indicator ratio described above;

IO completed: the number of IOs Completed over i) a small multiple of the shortest inter-arrival time of IOs application, also referred to as Tau, when it is known during SLA Enforcement, and for every ii) measurement interval. This is also required to calculate ContentionIndicator ratio;

MBTransferredRead: the total MBs of data transferred on Reads per measurement interval; and MBTransferredWrite: the total MBs of data transferred on Writes—per measurement interval.

Performance event logging may also be performed. There are two classes of performance-related events that may be logged, motivated by need to capture potential performance contention on the SDS 100. Logging is periodic and incidental or when a specific performance condition is detected. Periodic logging may also be performed. As described above, periodic logging of performance in terms of IOs submitted and IOs completed over the shortest inter-arrival time of IOs for the application, and measurement interval by the IO monitoring module.

A cache hit is a Boolean measure to detect if the IO was serviced from an SSD or Cache in the SDS 100. In the embodiments described herein, this attribute is tracked in real-time. The cache hit is determined by observing service times for the same size, usually for small sized to medium sized reads, where a cache performance can be an order of magnitude lower than from a disk. To simplify tracking this real time, the IO monitoring entity may compare IO service time for every IO and check against the MinServiceTime. One possible check that can be used to detect a cache is to determine if IO Service Time<CacheThresholdResponse then Cache Hit, where CacheThresholdResponse is configurable and initially it may be 1 ms. If the IO is determined to be a cache hit, it is tagged as such. So, the IO monitoring module needs to flag cache hit on a per IO basis.

Derived IO Performance

Besides the basic IO performance service level measurements, other performance metrics can also be derived. These other performance metrics may include:

MaxMBsRead—the maximum observed MBs for Read (based on total bytes read during any IO). Note this is not the average of Max but the maximum observed to date;

AverageMBsRead—the average of observed MBs for Read. This can be the average of all observed averages;

MaxMBsWrite—the maximum observed MBs for Write (based on total bytes read during any IO). Note this is not the average of Max but the maximum observed to date;

AverageMBsWrite—the average of observed MBs for Write. This can be average of all averages observed;

MaxIOPsRead—the maximum observed IOPs for Read (based on total bytes read during any IO). Note this is not the average of Max but the maximum observed to date;

AverageIOPsRead—the average of observed IOPs for Read. This can be average of all averages observed;

MaxIOPsWrite—the maximum observed IOPs for Write (based on total bytes read during any IO). Note this is not the average of Max but the maximum observed to date;

AverageIOPsWrite—the average of observed IOPs for Write. This can be average of all averages observed;

IOSubmissionRate (IOs/secs)—a running rate of IOs submitted to the SDS over the past "m" intrinsic intervals m*Tau (<500 ms) by the IO monitoring module. In one embodiment, the rate calculation window is 3 Taus, or m=3;

MaxIOSubmissionRate (IOs/sec)—the maximum rate of IOs to date submitted to the SDS over the past "m" measurement intervals m*Tau (<500 ms) and more;

IOCompletionRate (IOs/secs)—a running rate of IOs completed by the SDS over the past "m" intrinsic intervals m*Tau (<500 ms as an example) by the IO monitoring module. In one embodiment, the rate calculation window is 3 Taus, or m=3;

MaxIOCompletionRate (IOs/sec)—the maximum rate of IOs to date completed by the SDS. Since the IOCompletionRate is recorded by the IO monitoring module. It is noted that when the ratio AverageIOCompletionRate/AverageIOSubmissionRate drops below 1, it is an indication that the SDS is in contention and possibly in a region of exceeding maximum performance;

ContentionIndicator: for detection of contention in SDS: This is defined as the ratio ContentionIndicator=IOCompletionRate/IOSubmissionRate. Since the measurement interval is the same, this can be expressed as: ContentionIndicator=(#IOs completed over last m Taus)/(#IOs submitted over the last m Taus)=IOCompletedCounter/IOSubmittedCounter.

It is assumed that a moving window of size m*Taus is used, and that IO monitoring module is maintaining two counters IOSubmittedCounter and IOCompletedCounter. These counters accumulate the IOSubmitted and IOCompleted metrics that are already captured by IO monitoring module. The only requirement is that both counters are reset to 0 after m Taus. In some embodiments, m=3 but larger values of m may be considered. Note the reason for keeping the rate over a short window of m Taus is to avoid "washing out" the sudden changes over short times, which is in the order of a Tau.

The SDS 100 is noted to be in performance contention if it drops below its running average by certain fraction F, for example 20% (to be further refined) below the normal running average, ContentionIndicationAverage. It is expected that contention is expected when the IOCompletionRate<IOSubmissionRate or ContentionIndicator falls below 1. Since the ContentionIndicator value may show large variance with bursty traffic, the critical condition that, Critical=1 if ContentionIndicator<=ContentionIndicationAverage*(1−F), may occur within an interval and has to be recorded by the IO monitoring module.

Cache hit rate percent is calculated as the aggregated Cache Hit Rate for the flow in percentage using the cache hit field captured for an IO by the IO monitoring module. Depending on the storage system, it is possible that the Cache Hit Rate is 0. Average queue depth (also average number of outstanding IOs or OIOs) is the average number of outstanding IOs submitted that have not competed at the current time, e.g., measured at the end of the measurement interval. Max queue depth (also maximum outstanding IOs or OIOs) is the maximum number of outstanding IOs submitted that have not competed at the current time, e.g., measured at the end of the measurement interval.

It is noted that using Average IO completion rate and Average IO submission rate as indicators of maximum performance capacity region, the queue depth is not used. However, by observing max queue depth and the average service time, if the rate of increase of average service time is higher than the rate of increase in the queue depth, then it is also an indication of the SDS 100 being at its maximum performance capacity. In some embodiments, the average bandwidths of IOs submitted to the SDS 100 may be derived from IOPs submission rate by weighting with the IO size. Additionally, the average bandwidth completed by the SDS 100 may be derived from IOPs completion rate by weighting with the IO size. An IO error rate is the percent of IOs that are returned as errors by the target.

Almost all derived performance metrics may be computed in non-real-time, except IOCompletedCounter and IOSubmittedCounter as well as the check for Critical, which need to be monitored in real time to note if the edge of performance capacity is being reached. Computation of those metrics offline cannot be achieved since the time instances will be missed when the maximum performance capacity of the SDS is reached.

Because the simple token bucket models for characterizing VM workloads are restricted to moderately bursty IO models, an approach for highly bursty IO workloads is outlined.

Highly Bursty Workload Models

Highly bursty workload models will now be described. This is for cases where traditional token bucket models using do not suffice to capture the workload model. Since many large enterprise mission critical data applications can exhibit highly bursty IO behavior, this approach is well-suited for those cases.

Here, the following are covered:

How to model complex application workloads

Model for workload—that covers complex multi-rate models, not covered by Token Bucket parameters SLA Definition for the multi-rate model SLA Enforcement for multi-rate model using a commercial VM manager's storage queue control mechanism The following metrics may be collected to estimate SLA adherence to the original workload fingerprint.

An example of a statistical measure that may be applicable is the Extended

Pearson Chi Square Fitness Measure.

This is done when both pre- and post-contention IO data has been collected.

Let the number of bins in the histogram (more to be specified later) pre-contention be k1.

Let the number of bins in the histogram (same as above) post-contention be k2.

Let k=max(k1, k2).

Consider the pair of workloads and their associated workload histograms of the frequency of arrival rates observed over the monitoring period:

the pre-contention ("gold") workload E whose frequency for the ith bin, i<=k, the count or frequency of expected IO arrival rate is E.sub.i the contention workload for a given level of contention, assumed based on percentage of maximum performance of the target SDS, is C whose frequency for the ith bin, i<=k, the count or frequency of expected IO arrival rate is C.sub.i Then the error in terms of deviation from the original expected workload's distribution of arrival rates can be quantified in terms of the Pearson's cumulative chi-squared test statistic:

$$\chi^2 = \sum_{i=1}^{k} \frac{(C_i - E_i)^2}{E_i}$$

Where X.sup.2 is the Pearson's chi-squared fit test statistic; C.sub.i is an observed frequency of arrival rates in the ith bin in the contention workload histogram; and E.sub.i is an expected ("gold") frequency of arrival rates in the ith bin in the non-contention workload histogram.

Thus X.sup.2 measures the deviation of the observed performance in IO arrival and arrival rates for C (application workload under contention) from the expected performance of the application workload E without any contention.

Note that the X.sup.2 measure—the square of that residual or the difference between the two (also called the "residual") by the expected frequency to normalize the different frequencies (bigger vs. smaller counts). X.sup.2 or Pearson's chi-squared test value>1. Pearson's chi-squared is used to assess goodness of fit and tests of independence.

For a bursty workload characterization of a flow, unlike in the 2-parameter case, each workload may be represented as a vector that represents the frequency values of the different IOPs buckets, e.g., E={E.sub.i, for I<=n}, where E.sub.i is the frequency of arrival rates in the ith bin in the workload histogram. The workload under contention, changes to E'={E'.sub.i, for I<=n.

The error vector (E'-E) provides the deviation from the desired IO behavior when SLAs are to be enforced. This error vector can then be used as an input to admission control of all IOs from the VMs to the SDS.

Using Multiple Fingerprinting Methods to Model Application Workload

While the Token Bucket model used to characterize performance in terms of IOPs, and in more bursty workloads, a more complex statistical distribution model, such as the Pearson's chi-squared fit test statistic, of IOPs may be used, it may be effective in some cases to use multiple fingerprinting methods to model the expected workload and use the same to enforce SLA based performance.

In the examples considered thus far, the Token Bucket metric may be used for short term modeling and enforcing of performance, e.g., enforce a rate-based control over a short time scales. Over long-time scale, the Pearson's chi-squared fit test statistic may be used to ensure that when the IOPs increases, a larger share of the IO resource is allocated. Note that this approach could also include deterministic allocation of IO resources when the IO behavior of an application is predictable. Examples of predictive IO demand is for periodic task such as backups or creating periodic snapshots, Enforcing SLAs Per Flow The primary steps used in enforcing performance SLAs are:

Initial Monitoring: Log all IO data to capture each Flow (and each IO per as well estimate effective observed performance capacity (in terms of observed and derived for latency, IOPs, and bandwidth). The period for collecting data may be over days or weeks depending on the periodicity of the workload.

Build an Implicit Model and Estimate shared data storage Performance Capacity from Initial Monitoring data.

Derive SLA Enforcement Targets, Intrinsic Time Interval (Tau) (Token Bucket/Overbooking Model) and derive the maximum arrival rates (.alpha..sub.max) and the associated burst (.beta..sub.best.sub.--.sub.fit.sub.--.sub.max) that is allowed every time interval, and the percentage of IOs for each Flow is to be allowed to go to shared data storage based on the service levels specified by the SLA.

Alternatively, when the bursty model is used with the IOPs distribution vector E, then the error in the SLA target is the Pearson's Chi Squared Measure.

Basic Control: Token Bucket filters per SLA target will be enforced for every Flow per shared data storage—the idea is to drive the Workload to a target (Rate, Max Burst), or in the bursty case, drive it close to the original IOPs distribution. The level of error in each case is dictated by the SLA. Thus, an SLA that specifies 95% consistency means that the error between observed performance and target performance should be only 5% over the monitoring period.

Continuously record Workload IO parameters to monitor both attributes of the Workload, such as IO size, arrival rate, etc., as well as the performance parameters such as latency, completion times, etc. Intrinsic attributes are maintained so that any changes in the workload over time and changes in the applications are captured.

Record Storage Performance Capacity—dynamic performance parameters are captured to understand at a detailed level when contention is observed as well as understand the performance capacity of the shared disk storage. Also, this detects if the storage performance is degraded due to some failures in the disk arrays underlying the shared data storage (e.g., drive failure in a disk array). In such cases, the performance will be short lived, e.g., once the RAID rebuild has completed in the case of hard disk arrays (typically, hours to a few days or a day) the performance of the shared data storage should be restored to original levels.

Update Implicit Models, Storage Capacity—using the data collected in (5), update the new Token Bucket (TB) parameters or the IO distribution vector. The new parameters are fed to step (3) to derive the new TB parameters needed to enforce the SLAs For each IO in a Flow, collect detailed IO and Flow level information on service times, e.g., performance by the storage system per IO based on parameters such as IO size, etc.

Fine-Grained Control: use deadline based scheduling or Earliest Deadline First (EDF) as in where IOs from all flows to an SDS are collected every time interval but reordered or scheduled based on deadline.

Earliest Deadline First Scheduling Implementation for SLA Enforcement

In some cases where worst case IO completion times or deadlines are known, EDF scheduling can be applied, either at the host or in the network switch or storage. This approach is based on extensions that are used for providing fine-grained SLAs. Note this approach works most easily for workloads that can be modeled with Token Bucket.

The following lists the workflow and the algorithm used:

During the initial monitoring period of applications, information related to storage IO service times is gathered for various applications from which the IO deadline requirements are derived.

The system schedules IOs to the storage system such that IOs with the earliest deadlines complete first.

IOs in the EDF scheduler are grouped into 3 buckets:

EDF-Queue: IOs are fed into the EDF scheduler either from the rate-based scheduler or directly. Each incoming IO is tagged with a deadline and gets inserted into the EDF-Queue which is sorted based on IO deadlines.

SLA Enforcement Batch: the batch of IOs waiting to be submitted to the storage system. The requirement is that irrespective of the order in which the IOs in the SLA ENFORCEMENT-batch are completed by the storage system, the earliest deadline requirement is met.

Storage-Batch: This is the group of IOs currently processed by the storage system.

IO Flow: IO fed into the EDF scheduler typically goes from the EDF-Queue to SLA Enforcement Batch-batch to Storage-Batch.

EDF scheduler keeps track of the earliest deadline (ED) amongst all the IOs in the system and computes slack time which is the difference between ED and the expected completion time of IOs in the storage-batch.

Expected Completion Time of IOs in the Storage-Batch:

Computing the expected completion time of all the IOs in the storage-batch by adding the service times of IOs will be a very conservative estimate. Such a calculation could be correct if the EDF scheduler is positioned close to the physical disk but not when the EDF scheduler is in front of a storage system. Today's storage systems can process several IO streams in parallel with multiple storage controllers, caches and data striped across multiple disk spindles.

IO Control engine continuously monitors the ongoing performance of the storage system by keeping track of IO service times as well as the rate, R, at which IOs are being completed by the storage system.

Expected completion time of IOs in the storage-batch is computed as (N/R), where N is the number of the IOs in the storage-batch and R is the rate at which IOs are being completed.

Slack time is used to determine the set of IOs that can move from the EDF-Queue to the SLA Enforcement Batch—the next batch of IOs to be submitted to the storage system.

Monitored Data and Controls

The primary monitored data used as input for EDF include are described below Average IO service time or the IO completion time for any IO on a shared data storage represented as a sparse table: the table keeps the mapping function f for an IOi the average service time (i) is a function of the IO size, and other factors such as whether the IO is sequential or random and whether it is a read or a write. This is maintained besides the current view of IO service time which can vary. IO submission rate (t) is the current rate of IO submitted to the disk target. IO completion rate (t) is the current rate of IOs completed by the disk target.

Workload intensity is a measurement that can be used and is IO submission rate divided by the IO completion rate. It may be assumed that the IO submission rate should be normally less than the IO completion rate. Once the target storage is in contention, increasing IO submission rate does not result in increasing IO completion rate, e.g., once workload intensity is greater than or equal to one, the target storage is saturated, and the average service time should be expected to increase non-linearly.

Cache hit rate (CHR) for a given workload is estimated by observing the completion times of IOs for the workload. Whenever a random IO completes less than typical disk times (<0 (ms)), then it is expected to be from a cache hit, otherwise it is from a disk. If the CHR is consistent, it can be used to get a better weighted estimate of the IO service time.

The control parameters for the EDF are described below. A number n is the number of frames of the enforcing period Tau. Tau is the: enforcing period specific to the workload and is the same as used in the TB model to enforce shaping, and dictated by the average arrival rate of IOs for the workload.

The above parameters determine the number of IOs in the ordering set which is the set of IOs on which can reorder IOs.

There is a tradeoff factor between meeting deadlines and utilization of the target storage. The tradeoff factor may be an issue based on design choice. One issue is that if a large n is used and therefore a large ordering set (all IOs over n.Tau timeframe), can be squeezed in as many IOs in every enforcing period and optimize for the highest utilization. However, a large, ordered set results in large latency tolerance which can result in missing some deadlines. Thus, the tradeoff factor is n. If the user is allowed to choose a large n, then the maximum latency tolerance is equal to n times Tau, which is the average service time.

User Inputs (UI) or Inferred Inputs:

For EDF, explicitly gathered IO latency bounds are needed or they are inferred. This can be obtained in two ways that are described below. In one method, it is explicit from the user interface. In another method, it is implicit from the control entity.

IO Scheduling Approach

Figure 6:
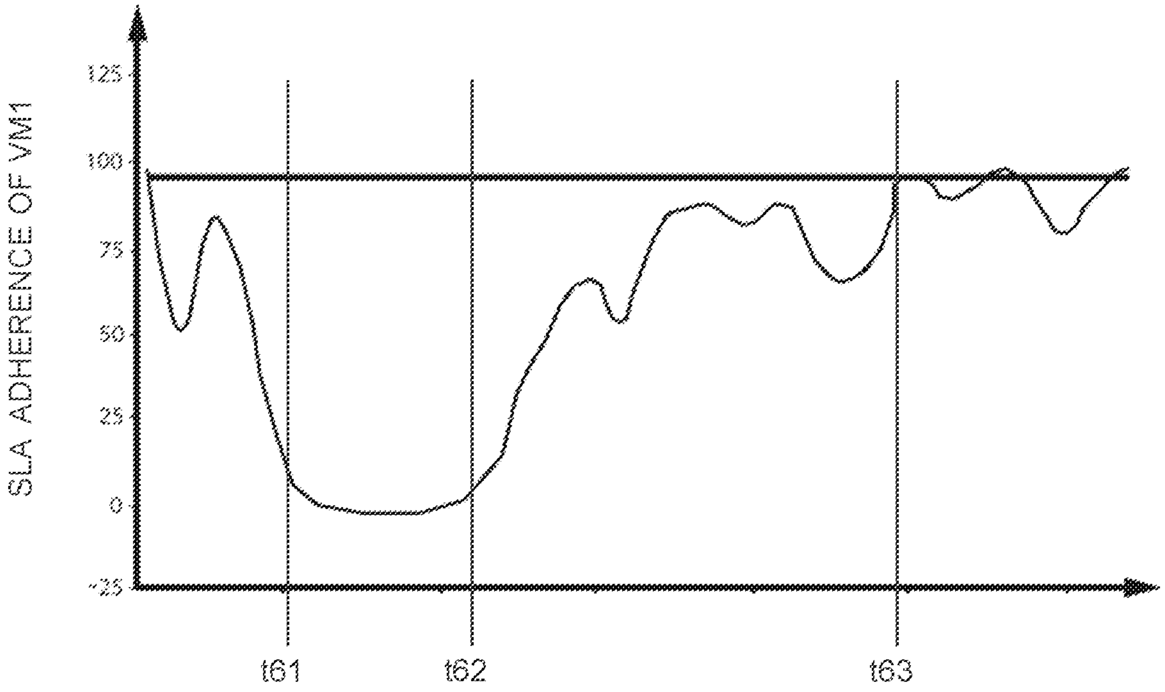
FIG. 6 is a block diagram illustrating an embodiment of combining SLA classes to shared storage queues, according to some embodiments.

A scheduling approach for enforcement will now be described. Reference is made to FIG. 6, which shows IO combinations for different service levels of VMs 108 in FIG. 1. The first service level 502 has the highest priority per its SLA agreement. The second service level 504 has the second highest priority per its SLA agreement and the third service level 506 has the lowest priority level.

The scheduling approach begins with building an ordered set of scheduling. This ordering is based on the number of IOs received per time unit, Tau, which is an enforcing period referred to as frame (e.g., at t.sub.curr, t.sub.curr+Tau, t.sub.curr+2Tau in FIG. 7). This is the sequence of IOs used for the scheduling. The IOs are not ordered by deadline but based on the admission control imposed by the SLA enforcement by class using the TB shaping described earlier. The ordered set is over n predetermined frames, based on tradeoff between meeting deadline guarantee and utilization. The enforcement column of FIG. 6 shows the number of IO requests per unit time, which may be Tau. The merged queue shows the priority of the queuing. As shown. The first service level gains the most queuing because of its priority in the SLA.

Figure 7:
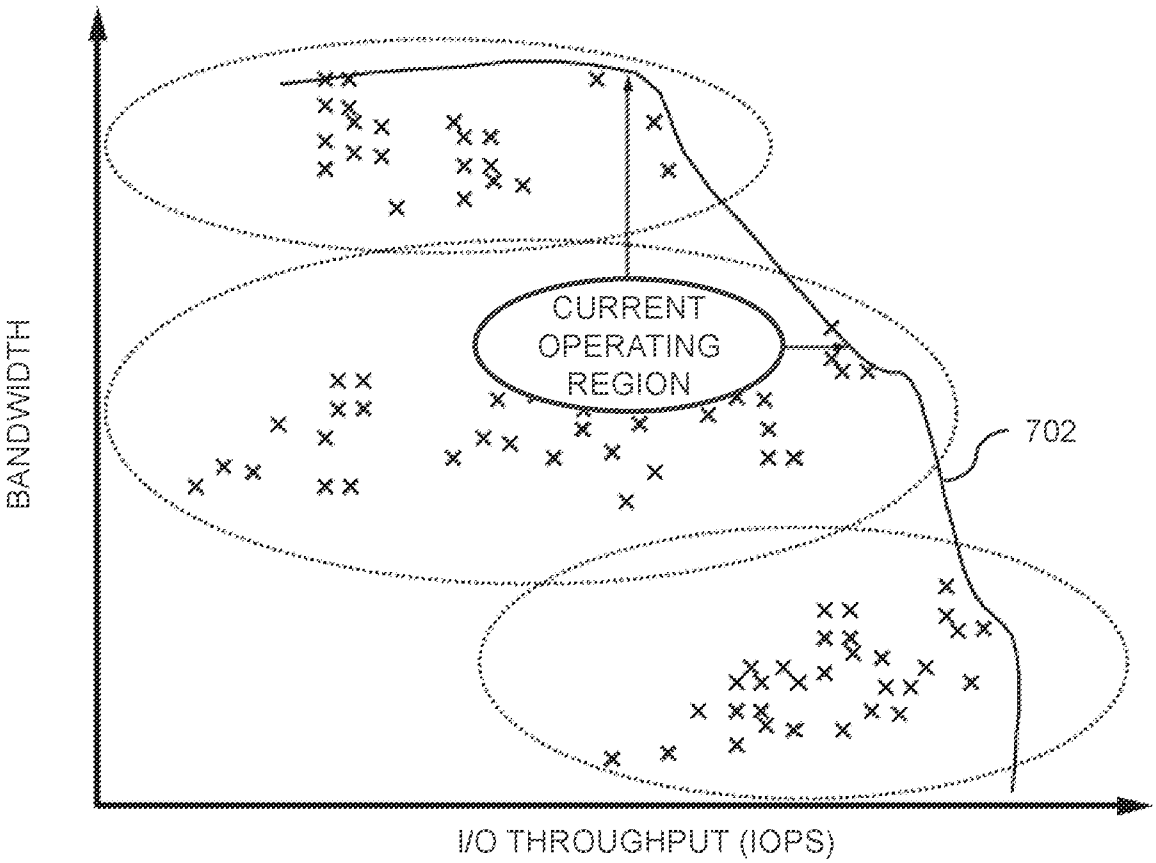
FIG. 7 is a diagram showing IO scheduling in a shared storage queue using reordering storage requests in each frame and using a frame packing technique, according to some embodiments.

FIG. 7 shows efficient IO scheduling in a shared storage queue using reordering IOs in each frame and using frame packing. Each period of Tau is filled with IOs obtained from the traffic shaping done by the SLA enforcement using a TB model. The total number of IOs of each SLA class or service level, shown as 1, 2 or 3 (for 3 SLA classes) are defined by the SLA enforcement policy, e.g., for any SLA class i, a certain percentage, e.g., 90% of all arriving traffic in the period Tau for SLA class 1 dare admitted to the target storage.

In the example above, the first Tau frame starting at t=t.sub.curr, there are 4 IOs from SLA class 1, 2 IOs from SLA class 2, and 1 IO from SLA class 3. In the second Tau frame starting at t=t.sub.curr+Tau, there are 2 IOs from SLA class 1, 3 IOs from SLA class 2, and 1 IO from SLA class 3. In the third Tau frame starting at t=t.sub.curr+2Tau there are 2 IOs from SLA class 1, 2 IOs from SLA class 2, and 3 IOs from SLA class 3. The TB enforcement may be set by expected rate off IO and the burst size for each workload as is well-known in the art, and the percentage statistical guarantee of supporting IOs for that class onto the target disk. In summary, the TB shaping provides reserved capacity in terms of IOs for that workload for that SLA class.

In one embodiment, referred to as horizon related EDF, the admitted IOs are ordered per Tau for each frame by their deadlines EDF. The ordered set or the number of IOs to be considered in the re-ordering queue is all IOs in n Tau frames. For example, for highly latency sensitive application, two frames could be used, but more can be considered. Horizon refers to the largest deadline of the ordered set. So, if there are N IOs in n Tau frames, then the horizon is equal to Max.sub.i<N {Deadline(i)}. Therefore, all scheduled N IOs in n Tau time period must be completed in (t.sub.curr+horizon). The term "level" is the maximum time of completion, e.g., the level for the ordered set, is the maximum completion time for all IOs in the ordered set, or Level=t.sub.curr+Sum.sub.i<=n{Average_Service_Time(i)} where Average_Service_Time is selected from the Service Timetable using the properties of I, in terms of IO Size, Random/Sequential etc.

IOs are submitted to the SDS 100 from the ordered set as soon as the schedule for submission is completed. It is assumed that the SDS 100 can execute them in any order or concurrently. As indicated before, with larger n, the utilization of the SDS 100 can be increased.

As each submitted IO from the Ordered Set is completed by the SDS 100, the Actual Service Time is compared against the estimated response time. Since the Average_Reponse_Time is based on typical or average execution time, the discrepancy or error, E(i), is measured as E(i)={Average_Service_Time(i)−Actual_Service_Time(i)}. It is expected that E(i) is positive, or that the Average Service Time is pessimistic, thus as IOs complete, the level is corrected as Level<=Level−E(i). As the Level is updated with positive errors, it exposes more slack time since the target storage system is not as busy as had been expected.

Updating the Average Service Timetable as a function of Workload Intensity will now be described. Since the Service Time is based on load (where load is approximated by Workload Intensity=(IO Submission Rate)/(IO Completion Rate), it is possible to get further granularity in Average Service Times as a function of Workload Intensity, e.g., Low, Medium, and High. In some instances, more granularity may be useful.

The next step involves ordering IOs in each frame in an ordered set. Once each frame's IOs are received, the IOs are ordered based on the deadline of each IO. Because the IOs have been admitted for the frame, the ordering is done based on an IO's deadline independent of its SLA class.

The final step is frame packing, which involves calculating the slack time in each 5 frame for the Ordered Set. If there is sufficient slack time in a frame, move the IOs with the earliest deadline from the next frame into the current frame.

It is assumed that all IOs complete within a frame based on admission control imposed by TB shaping. At this stage, the estimation of the completion time is made using the Average Service Timetable for each IO. If there is slack left, where Slack Time=Sum.sub.i<=N{Actual_Service_Time(i)}<n.Tau then IOs are moved from the next frame (e.g., the IOs from second frame would be considered to be scheduled in the slack time of the first frame). The order of the IOs to be moved are IOs with the earliest deadline and if there are two of the same deadline, then move the IO of the higher SLA class.

When moving up IOs, priority may be given by SLA class, e.g., move any SLA class 1 IO before SLA class 2 and so on. It is noted that this is done only if there is no ceiling on the SLA class that is moved up to the next frame. At the end of the end of each Frame Packing step, we would get the best IO packing per enforcing period or Tau within the Ordered Set.

Examples of SLA Enforcement with In-Band Network Appliance

Below are descriptions of examples of workloads that share the same storage, with different SLA settings, and how in-band or network-level SLA enforcement was used to ensure SLA adherence as shown in FIGS. 6 and 7.

SLA Control Out-of-Band at the Host Server or Virtual Machine Host

Since SLA enforcement can be considered both at the storage level, the network level as well as the VM host server level, an embodiment of SLA enforcement at the VM host server is now considered. A commercial VM manager utility that control's the allocation of IOs in the output queue of the VM host server was used as the mechanism to enforce SLAs. The control mechanism that implements this SLA enforcement will now be described.

MIMO Control for SLA Enforcement Using VM Host Storage Output Queue Control Mechanism The following description relates to a control theoretic approach that uses multiple input multiple output (MIMO) controls to reallocate IO resources in the host server to different flows to ensure meeting target SLAs. In this example, the number of VMs 108 is m. Each VM 108 is represented as Vi for the ith VM, k=m. The VM host storage output queue control mechanism is called SIOCTL. In SIOCTL each VM 108 is allocated shares in the output queue of the VM host 104. The shares allocated to VM i at time t is denoted by Ui(t), i<=m. The target SLO for IO performance in IOs per second or IOPs, for Vi is Ti, where Ti is a constant or the desired IOPs SLO.

In one implementation, a linear discrete time MIMO model can be used, where the outputs X(t) are linearly dependent on the input vector U(t) and the state vector X(t). The observed state vector is X(t) where Xi(t) is the current IOPs performance SLO parameter for Vi. It is assumed that an observed rate for each Vi assuming current workload model will be X(t+1)=AX(t)+BU(t). The desired output is to minimize the following errors described by Y(t)=|Xi(t)−Ti|=0 or more realistically the error |Xi(t)−Ti|<Δ (where Δ stands for DELTA), where d is some small tolerance. Therefore the output vector Y(t) is the error (or IOPs SLO deficit) vector, where Yi(t)=Xi(t)−Ti, where Ti is constant, the equation is Y(t)=X(t)−T, where T is the n.times.1 vector comprising the target rates for each Vi, e.g., Vi's target current rate is Ti. Ti will vary based on the SLA enforcement mode since the desired target will be different based on stage of enforcement.

The goal is select inputs U(t) at each to time t such that Y(t) or the error vector is driven to the zero vector or Y*((t)=[0]. An embodiment of the process is to deploy any control mechanism for ensuring the output Y (the error vector) can be controlled by determining A and B in the main state equation, X(t+1)=AX(t)+BU(t). This requires for n VM systems to calculate 2*m*m number of coefficients, m*m in each of A and B.

Since A is dependent on the current state of the system, e.g., where the number of IOs/Tau or tokens the VMs are allotted, a simplifying assumption is made that all VMs are in the linear range of operation. Therefore, the VMs are not in contention most of the time, for the same workload (on each VM Vi), the output change seen in X(t+1) does not matter on X(t) but only on the control inputs U(t), e.g., the shares we give (or the token that are allocated). In the simplified case, A=0 matrix, and X(t+1).about.BU(t). That is x1(t+1)=al1u1(t)+al2u2(t)+ . . . +alkuk(t)+ . . . +alnun(t), where 1<=l<=m. It follows that optimization reduces finding the matrix B so that that number of shares should be allocated to ensure Y(t)=0 is known. There is one constraint in this optimization where .Σ.ui(t)=S, where S is a constant, or the total number of shares allocated in the SIOCTL and Σ is SIGMA. Therefore, any change across ui(t) at any time must be such that .Σ·Δ·ui(t)=0.

Solution to Optimal Reallocation of IO

This step of re-allocating IO shares in the host server's output queue is initiated, if the SLA is not being met by any of the workloads. The steps involve estimating initial change in allocation of shares .Δ.U0 for pair-wise reallocation step. The VM that is below its SLA is referred to as Vi. The VM with lowest SLA (lower than Vi) which is getting IOs above its SLA is referred to as Vj. The initial incremental change in shares is .Δ.U0. The shares for Vi will be increased by .Δ.U0. The shares for Vj will be decreased by .Δ.U0. The result is that ui(t+1)=ui(t)+.A.U0 and uj(t+1)=uj(t)−.A.U0.

Since the transfer function B coefficients are not known, (e.g., bpq where bpq=.differential.xp(t)/.differential.uq(t)) an initial guess on what .Δ.U0 should be is be made. One possible computation would be based on proportional shares. Therefore, if xi(t)=c, xj(t)=d; and the deficit in SLA for Vi is di=(Ti−xi(t)) and the surplus in SLA for Vj is dj=(xj(t)−Tj), then the need shares are calculated. The relative needed shares may be calculated as .Δ.ui=S di/xi(t) and .Δ.uj=S dj/xj(t), where .Σ.ui(t)=s is total number of shares. Then .Δ.U0=(.Δ.ui+.Δ.uj)/2 or the mean incremental shares to be changed.

Estimating Shares Per Flow with Pair-Wise Reallocation Using Feedback

Changing ui(t+1)=ui(t)+.Δ.U0, and uj(t+1)=uj(t)−.Δ.U0, will result in a new set of SLA values x(t+1) at t+1. In the following example, .Δ.u(t)=.Δ.U0 and xp(t+1)= bp1u1(t)+ . . . +bpiui(t)+ . . . +bpjuj(t)+ . . . +bpnun(t), for 1<=p<=n. Since only ui(t+1) and uj(t+1) has changed across all inputs ui since time t, then the changes in SLA (rates) for all VMs are xp(t+1)−xp(t)=bpi[ui(t+1)−ui(t)]+bpj[uj(t+1)−uj(t)]. This can be written as .Δ.xp(t+1)=bpi. .Δ.u(t)−bpj. .Δ.u(t) for 1<=p<=n. Since the change in the SLA .Δ.xp(t+1) are measured and .Δ.u(t) is known, there are now m equations in 2m unknowns, b1i . . . bin, and b1j . . . bnj, so another incremental share reallocation round is needed to get better estimates of bpj and bpi coefficients.

It is likely that the desired target is not achievable, then the new incremental shares described in the first part of the process above and then at time (t+1) re-estimate are recalculated. By recalculating, .Δ.u(t+1)=.Δ.U1, where .Δ.U1= (.Δ.ui+.Δ.uj)/2 or the mean incremental shares to be changed based on the deficit and excess in SLA of Vi and Vj as done above. By following the same steps, .Δ.xp(t+2)=bpi times .Δ.u1(t)−bpj times.Δ.u1(t), for 1<=p<=m. Between the last two equations, there are 2m linear equations in 2m unknowns and it is possible to use linear computing methods to solve it. Once estimated values are known based on feedback, for bpi and bpj transfer coefficients, the initial estimate of forcing function (the multiplier) on how much the change in shares for Vi and Vj can help in reducing the error Y is known.

Since changes in shares for 1 VM 108 can affect all others, the incremental shares will be kept low. And if the changes result in other VMs missing their SLA, then the pairwise process with other VMs will have to be repeated. The one challenge in this approach is to make small changes in each pair until all VMs meet their SLAs. Once all transfer coefficients in B are known, then multiple input changes can be made. Another challenge will be oscillation, e.g., changes made in the first pair of VMs can be reversed if changes are made in the second pair of VMs and all VMs are never in SLA adherence. If this happens, changes to multiple VM shares may have to be made, but only after the transfer coefficients for all VMs (B) are better known.

The process continues if the stealing shares from Vj to Vi are not sufficient and Vj is down to its minimum intrinsic SLA level.

Successive Pair-Wise Re-Allocation of Shares

If "stealing" shares from the single lower SLA VM Vj does not work, then the next VM which has lower SLA than Vi but higher than Vj is picked. This VM is referred to as Vk. The same initial steps described above are used, and a determination is made if shares stolen from Vk and given to Vi allows both Vi and Vk to be in SLA adherence.

Summary of Generalized Approach

Following the MIMO control model, the approach is summarized as follows. The process begins with identifying the system behavior with the equation X(t+1).about.BU(t) (where the dependence, AX(t), on the current SLA value is ignored as long as it is not deep into contention). For example, there may be a predictable model of the expected SLA rates x(t) for all VMs whenever different shares u(t) are allocated. In this approach, a determination is made as to the transfer function B as outlined in the process described above. The steps are optimized to reduce the error vector with respect to the SLA rates for each VM, Y(t)=X(t)−T. This becomes a stepwise optimization problem, either changing all values simultaneously once the system is known (B in (i)). Since the full transfer function may not be known, as one approach a pair wise reallocation of shares can be done while estimating the subset of transfer function. The expectation is that SLA adherence can be achieved incrementally without changing all shares—e.g., assuming that the interference between all workloads is not large. Because SLA monitoring means checking adherence of SLAs, an embodiment for SLA adherence is defined for the TB model case.

Example of Out-of-Band SLA Enforcement at Virtualization Host

A few examples of workloads that share the same storage, with different SLA settings, and how SLA enforcement implemented at the VM host server using a commercial VM manager's host storage output queue control mechanism called SIOCTL control mechanism (FIGS. 10 and 11) are described below.

Figure 10:
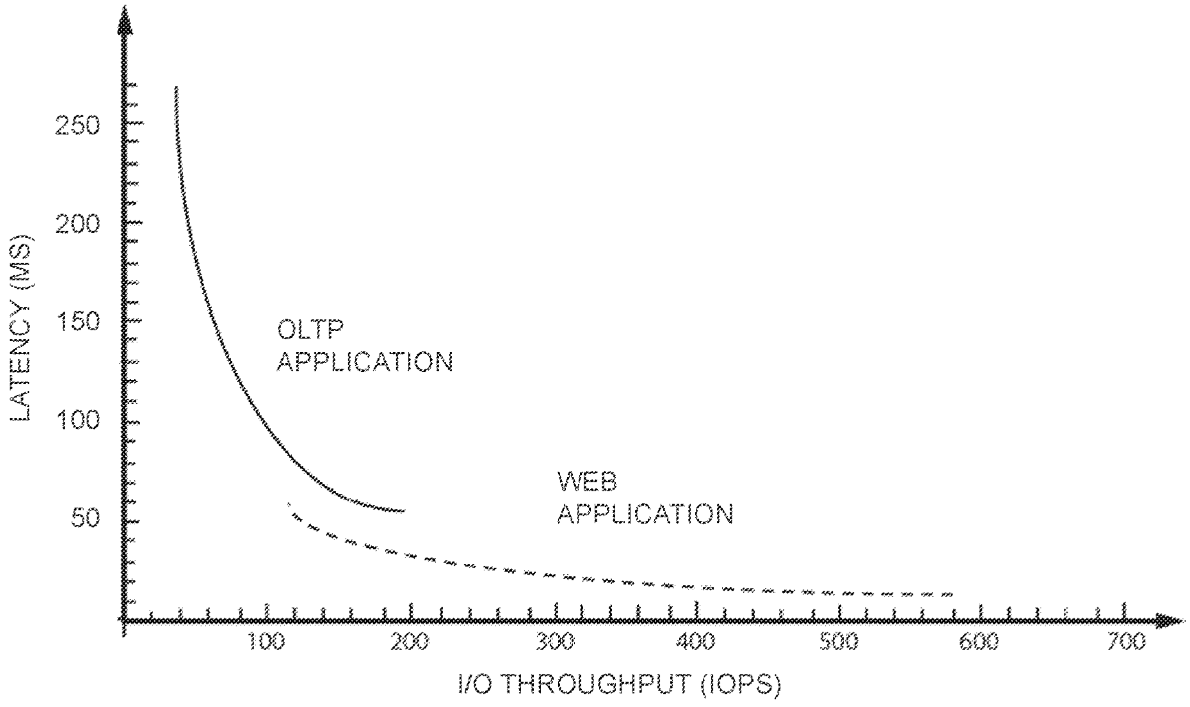
FIG. 10 is a graph showing latency versus IOPs characterization of two VMs in normal operation, according to some embodiments.

FIG. 10 shows the workload profiles of two applications (VMs), an online transaction processing (OLTP) and a web application, during normal and acceptable performance operating mode. The OLTP application has both read and writes of medium to large IO. Its baseline IOs/sec or IOPs are in the range of 50 to 200 IOPs and associated latency of 50 to 250 milliseconds (ms). The web application is a read-only application for small data as expected from a browser application. Its IOPs range is 120 to 600 with latencies in the range of 10 to 50 ms. In this case, the OLTP application is tagged as the higher SLA application and the web application as the lower SLA application.

The top chart of FIG. 11 shows first, how the workload profile for both applications change when the web application increases its workload to more than twice its baseline IOPs. The result of this "misbehavior" results in the web application increasing its IO rate by 100%, from 120-600 range to 380-1220, with modest increase in latency. The impact of the increased web application IOs causes the OLTP application to drop well below 100 IOPs and latency to deteriorate from 50 to 250 ms range to 100 to 290 ms. This is because the smaller more frequent reads from the same shared data storage, increases the read and, especially, write operations to be delayed.

The bottom chart of FIG. 11 shows how closed loop control in the host server, using SIOCTL to reallocate shares in the output queue of the host server, is used to enforce SLAs on both workloads. Closed loop control ensures that the OLTP application is brought back to the original IOPs and latency range. This is achieved at the expense of web application which had a lower SLA setting, and its greater number of IOs experience higher latencies and lower IOPs.

Dynamic Provisioning Basis

From FIG. 3, it is evident that an embodiment to utilize the storage resources for all VMs may require the steps described below. Flow and workload are monitored and performance is captured and other service levels and associated resource usage per VM, virtual storage (LSV) and the underlying SDS 100 are also monitored and captured. If SLAs are being violated by a VM (app), the SLAs are enforced. If SLAs of a VM are not being met by the current LSV, then re-provision (modify or migrate) may be performed.

Monitoring and Controlling VM Resource Usage

An embodiment for monitoring and controlling VM resource usage will now be described. The process begins with monitoring resource usage per VM, logical storage volume (LSV) and the underlying SDS. In order to support this step, the performance in SLOs at both the VM (application) level and also resources at the virtual storage (LSV) level, whether the LSV is in the hypervisor host or behind the SAN. This monitoring is done for both at the VM and VM manager, as shown in FIG. 4, and also at the network and storage level using scheduling as one embodiment, as shown in FIG. 6.

The process continues with enforcing SLAs on VMs that exceed their negotiated resource needs. SLOs for the VM are monitored at the VM level (FIG. 5). If SLOs are not being met, and in turn thus SLAs are not being met, then we check if the storage SLA violation is caused by a VM that shares the same storage resources. Storage resources include the SDS D where the current VM b and its associated LSV b are located. If another VM c that is provisioned on an LSV c is also on D, then we verify if LSV c is using more performance capacity than specified in its SLAs.

Figure 4:
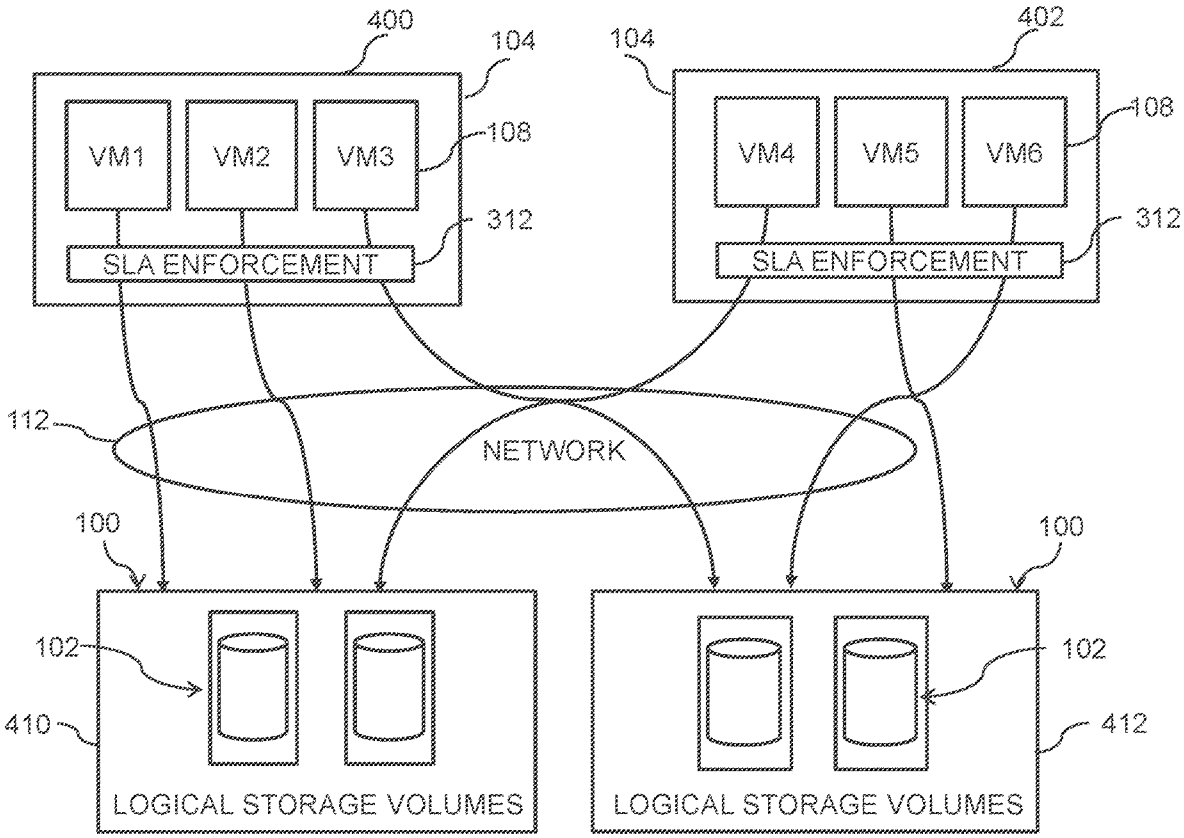
FIG. 4 is an embodiment of an implementation of service level agreement (SLA) monitoring and enforcement performed at a host server, according to some embodiments.

SLA violation can occur in case of either explicit SLO specification (e.g., Max IOPs=5000), or implicit SLO specification (e.g., 90% of the maximum intrinsic IOPs, as shown in FIG. 4. If VM c is consistently exceeding the SLO, then we can enforce the SLA by reducing IO shares at the VM level. Alternately, based on the measured IOPs for VM c at the VM level, we can limit the IO rate that is allowed into the SDS D. Either approach is possible for SLA enforcement for VMs that violate the SLA. The approach chosen will be based on factors such as shortest time to SLA compliance and cost.

The process continues with re-provision the LSV for VMs whose SLAs are not being met. If a VM SLO is not being met and other VMs that share its SDS are not the cause for lack of compliance, then the storage system can re-provision the LSV for the VM. As described earlier, there are two options possible. One, if there is spare capacity in the SDS to meet the SLO objective that cannot be met, then the LSV can be modified by adding more resources to it on the same SDS. For example, to increase the IOPs requirement for a VM, an SDS that uses a tiered SSD-HDD combination might move some portion (active frequently accessed blocks) or all blocks of the LSV to its SSD tier. If such internal SDS moves or modifications are not possible, then the LSV, either a portion of it or all of it, has to be migrated to another SDS that can meet all SLOs of the VM.

Dynamic Provisioning Process

Figure 12:
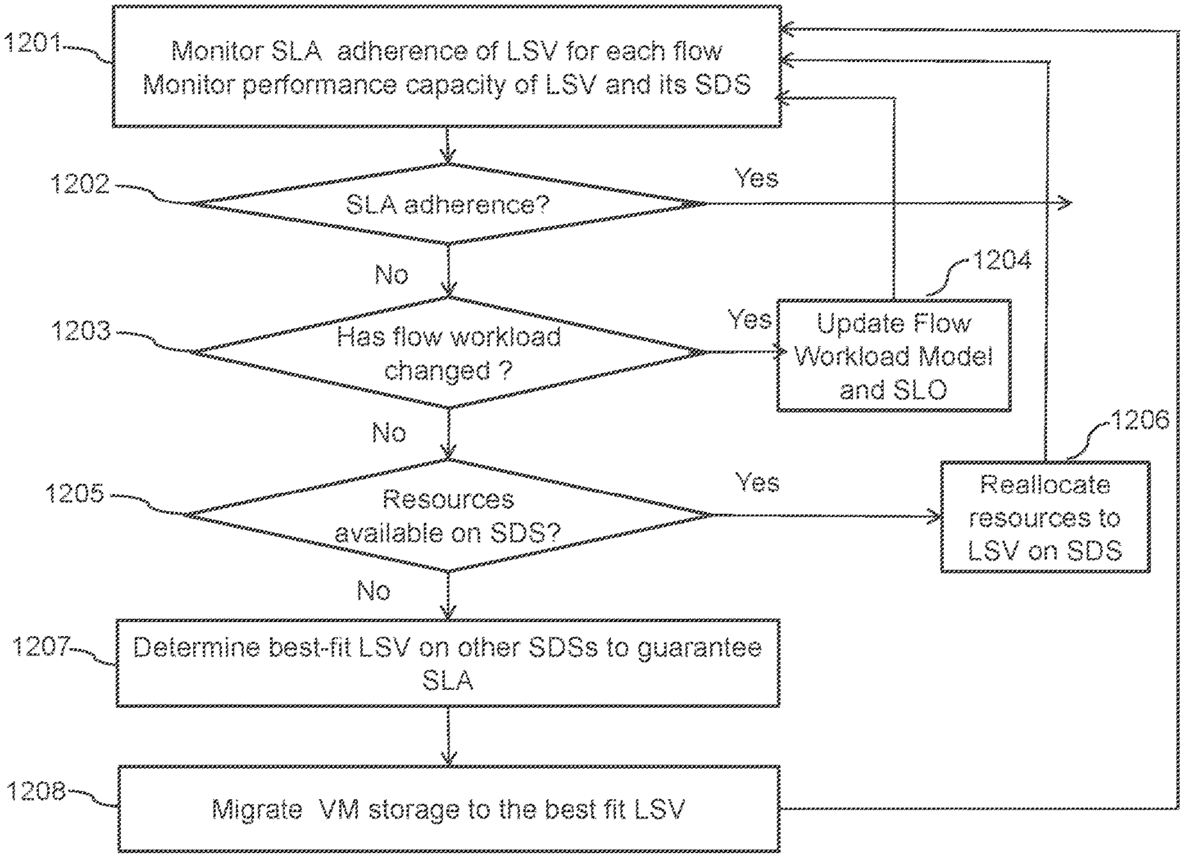
FIG. 12 is a flow chart describing a method of an embodiment for provisioning storage, according to some embodiments.

FIG. 12 shows the flowchart for the dynamic provisioning process at the VM level.

Dynamic Provisioning Basis

One analytical basis for dynamic provisioning is based on using multi-dimensional or vector bin packing algorithms. An embodiment of the algorithms will now be described. Each VM i, I<=N, specifies its SLO as a p-dimension vector S[i]={s1, s2, . . . sp}, where sk refers to a different SLO element such as: maximum size; explicit SLA-minimum IOPs; explicit SLA-maximum latency; implicit percentile SLO; snapshot; compression; and encryption. Each SDS D j, j<=M, that can be partitioned into virtual storage volumes, LSVs, has a total available resources D[j]={r1, r2, . . . rp} where the rk refers to the maximum capacity for each of the SLO elements listed above. A provisioning step thus assigns N LSVs such that each VM is assigned an LSV which can meet the SLOs for the VM, and the sum of all capabilities of the LSVs assigned to a given SDS does not exceed the total maximum capacity for all SLO elements in that SDS. Heuristic vector bin packing algorithms, including the ones described above, can be used satisfy the constraint satisfaction problem as posed above.

In one example, an SLA can be a contract that includes consequences of meeting or missing a Service-level objective (SLO). The SLA can set the expectations between the service provider and the customer and describes the products or services to be delivered. SLA is a contract between a provider and its customers, telling it what the awaited quality of service is. The SLA can be an explicit or implicit contract with a user. The SLA can include the consequences of meeting (or missing) any SLOs they contain.

In one example, a Service-level objective (SLO) can be a key element of an SLA between a service provider and a customer. In some embodiments, SLOs are agreed upon as a means of measuring the performance of the Service Provider and are outlined as a way of avoiding disputes between the two parties based on misunderstanding. SLO can be a set of (e.g. updatable) specific performance requirements for a service level of the workload of the first virtual machine that are adapted in response to at least one provisioned logical storage volume (LSV) enforcing the SLA to meet the SLO, wherein the LSV is coupled with the first virtual machine. SLO can be a specific measurable characteristic of the SLA (e.g. such as availability, throughput, frequency, response time, or quality). In one embodiment, a SLO can be the objectives that are to be achieved for each service activity, function, and process. The SLO can refer to the objective that a provider wants to reach in terms of QoS (Quality of Service). The SLO can include various identify key metrics (e.g. service level indicators (SLIs)) from the end-user viewpoint. The SLO can make the key metrics measurable.

Figure 13:
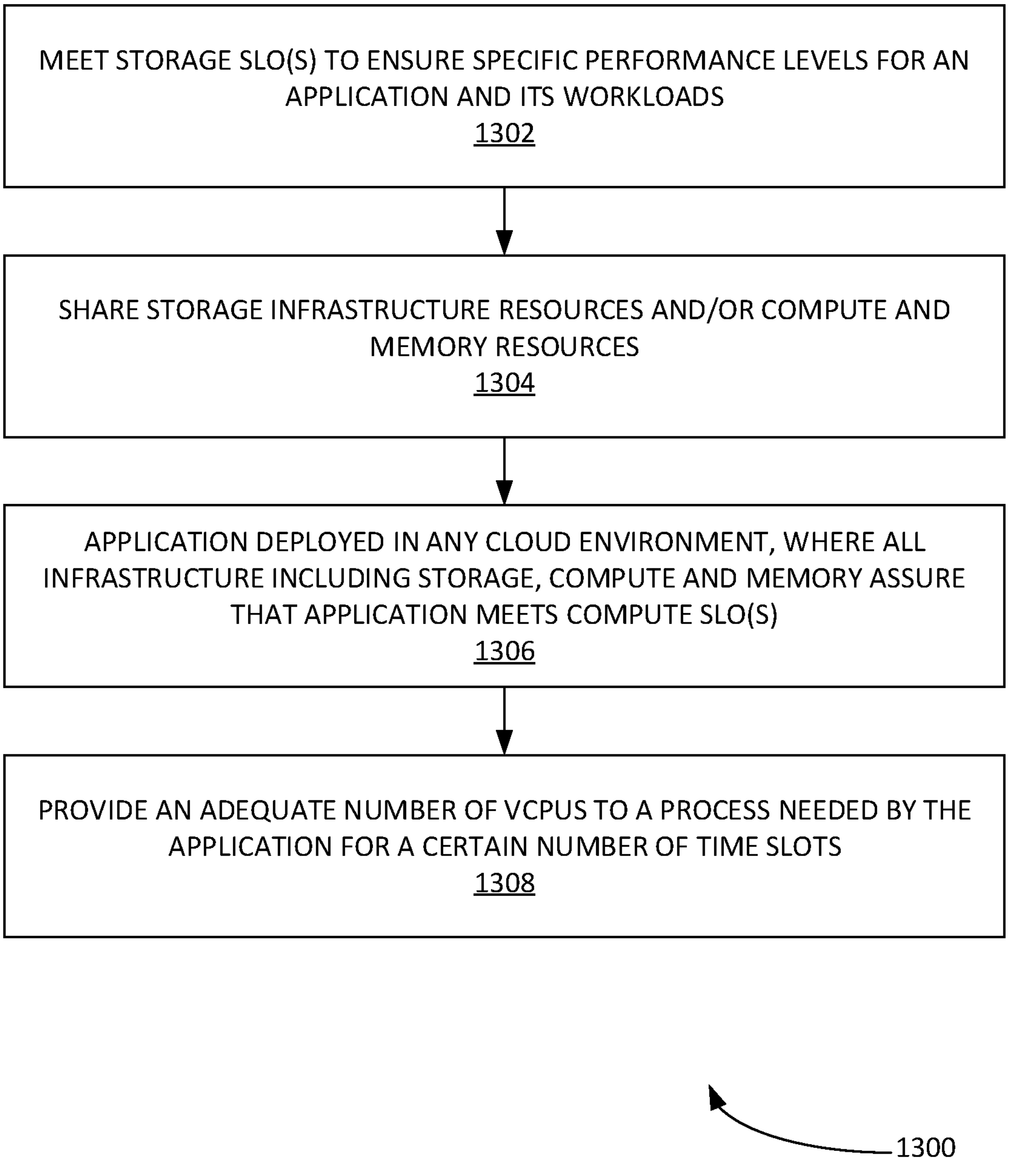
FIG. 13 illustrates an example process for the generalization of SLOs for all aspects of the Application Performance, according to some embodiments.

FIG. 13 illustrates an example process 1300 for the generalization of SLOs for all aspects of the application performance, according to some embodiments. Process 1300 can extend the methods and systems provided supra to managing SLOs for all aspects of the application/workload and not just for managing storage (e.g., generalize from storage resource requirement of the application/workload to include compute and memory). It is noted that storage management is used for the overall health of IT infrastructure. With the predominant use of storage virtualization, storage systems have become a critical component of any IT environment, and storage performance issues can contribute to a negative impact on the application performance problems, such as delays or outages.

In step 1302, process 1300 can meet storage SLOs to ensure specific performance levels for an application and its workloads. This means that when the application is running in a virtual environment (e.g. where storage I/O is shared), it is assured a certain performance level. Process 1300 can determine a correct/optimum level of storage performance in terms of IOs/sec (IOPS) and or minimum latency in response time.

In the case applications running in the cloud, in step 1304, process 1300 can share storage infrastructure resources and/or compute and memory resources as well. Process 1300 can also provide for the sharing of other services including, inter alia, specific application services (e.g., a database service provided as a SaaS).

Problem 1300 can meet application-level SLOs for any application workload/application (e.g., cloud-native or microservices application(s)). In step 1306, the workload/application can be deployed in any cloud environment, where all infrastructures including storage, compute (e.g. in terms of virtual CPUs in VMs) and memory, assuring that the application meets/specifies compute SLOs (e.g., number of CPU cores or virtual CPU cores for a duration, and/or i.e., CPU-seconds, etc.). This is because in a provisioned virtual machine, the CPU capacity allocated is a share of the physical host's CPU, from multiple vCPUs that it can schedule in a given time slot. In step 1308, process 1300 can provide an adequate number of vCPUs to a process needed by the application for a certain number of time slots. Accordingly, a memory SLOs can provide the minimum amount of memory needed to run the application. Process 1300 can also provide the specifications of storage SLOs as well.

Therefore, the approach of managing SLOs of the application storage can be extended by process 1300 to the compute and memory aspects of the application using the same method to the whole application.

Figure 14:
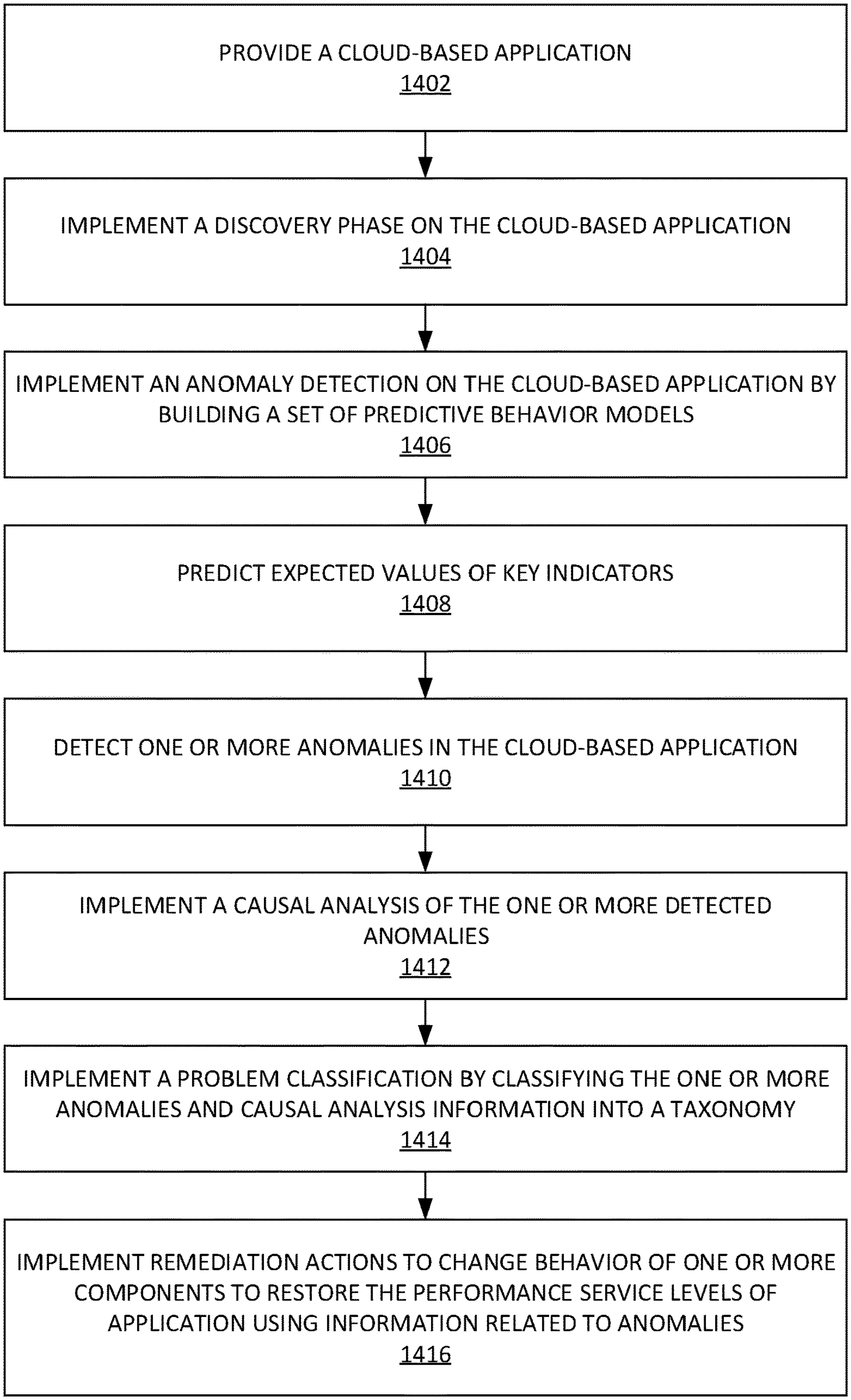
FIG. 14 illustrates an example process for a computerized method for managing autonomous cloud application operations, according to some embodiments.

FIG. 14 illustrates an example process 1400 for a computerized method for managing autonomous cloud application operations, according to some embodiments. In step 1402, process 1400 provides a cloud-based application. In step 1404, process 1400 implements a discovery phase on the cloud-based application. The discovery phase includes ingesting data from the cloud-based application and building an application graph of the cloud-based application. The application graph represents a structural topology and a set of directional dependencies and relationships within and across the layers of the cloud-based application.

In step 1406, process 1400 can, with the application graph, implement an anomaly detection on the cloud-based application by building a set of predictive behavior models from an understanding of the complete application using a priori curated knowledge and one or more machine learning (ML) models. The set of predictive behavior models fingerprints a behavior of the cloud-based application behavior.

In step 1408 process 1400 predicts expected values of key indicators. In step 1410, process 1400 detects one or more anomalies in the cloud-based application.

In step 1412, process 1400 implements a causal analysis of the one or more detected anomalies. The causal analysis includes receiving a set of relevant labels and a set of metadata related to the one or more detected anomalies, and the structure of the application graph. The method generates a causal analysis information and fault isolation.

In step 1414, process 1400 implements a problem classification by classifying the one or more anomalies and causal analysis information into a taxonomy. The taxonomy includes a set of details on the nature of the problem and a set of remediation actions. In step 1416, process 1400 implements the remediation actions to change the behavior of one or more components to restore the performance service levels of the application using the information related to the one or more anomalies, the causal analysis information as related to the taxonomy, and the control action information associated with the anomaly within the taxonomy. It is noted that a virtual machine can be used in the same sense as a microservice component (e.g. as an application) in some embodiments.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method for dynamic provisioning of storage for virtual machines in a virtualized data center, the method comprising:

receiving, at a storage management system, storage requirements for a first virtual machine, wherein the storage requirements are specified by a service level agreement (SLA) for the first virtual machine and include a service level objective (SLO) comprising one or more measurable storage performance targets for storage used by the first virtual machine, and wherein the SLA is a contract that includes consequences of meeting or missing the SLO;

assigning, by the storage management system, the first virtual machine to a first logical storage volume located on a first shared data storage based on a determination that the first logical storage volume satisfies the SLO for the first virtual machine;

identifying a first input/output flow defined by the first virtual machine and the first logical storage volume;

capturing, for the first input/output flow, input/output attributes at an individual input/output packet level to produce a workload fingerprint for the first input/output flow, wherein the input/output attributes include at least one of input/output size, read/write type, sequential or random access pattern, service time, input/output submission rate, or input/output completion rate;

monitoring, using the captured input/output attributes, resource usage for the first virtual machine, the first logical storage volume, and the first shared data storage;

detecting, based on the monitoring, that the SLO for the first virtual machine is not being met;

determining whether the SLO for the first virtual machine is not being met because a second virtual machine, provisioned on a second logical storage volume located on the first shared data storage, is using more performance capacity than specified in a service level agreement associated with the second virtual machine;

when the SLO for the first virtual machine is not being met because the second virtual machine is using more performance capacity than specified in the service level agreement associated with the second virtual machine, enforcing the SLA for the first virtual machine by controlling input/output to the first shared data storage, wherein controlling input/output to the first shared data storage comprises at least one of reducing input/output shares allocated to the second virtual machine or limiting an input/output rate allowed into the first shared data storage for the second virtual machine, and wherein enforcing the SLA for the first virtual machine comprises applying, at a storage input/output level, at least one of rate-based input/output traffic shaping or deadline-based scheduling to input/output associated with the first input/output flow; and when the SLO for the first virtual machine is not being met and the second virtual machine is not a cause of the SLO not being met, re-provisioning the first logical storage volume by at least one of modifying the first logical storage volume to add storage resources on the first shared data storage or migrating at least a portion of the first logical storage volume to a second shared data storage that satisfies the SLO for the first virtual machine.

* * * * *